US006847477B2

(12) United States Patent
Oron et al.

(10) Patent No.: US 6,847,477 B2
(45) Date of Patent: Jan. 25, 2005

(54) OPTICAL SYSTEM FOR CONVERTING LIGHT BEAM INTO PLURALITY OF BEAMS HAVING DIFFERENT WAVELENGTHS

(75) Inventors: Ram Oron, Rehovot (IL); Doron Nevo, Ra'anana (IL)

(73) Assignee: Kilolamdia IP Limited (VG)

( * ) Notice: Subject to any disclaimer, the term of this patent is extended or adjusted under 35 U.S.C. 154(b) by 327 days.

(21) Appl. No.: 10/084,796

(22) Filed: Feb. 27, 2002

(65) Prior Publication Data

US 2002/0154383 A1 Oct. 24, 2002

(30) Foreign Application Priority Data

| Feb. 28, 2001 | (IL) | ................................. 141727 |
| Jul. 23, 2001 | (IL) | ................................. 144498 |
| Nov. 25, 2001 | (IL) | ................................. 146723 |

(51) Int. Cl.[7] ............................. G02F 2/02; G02B 6/293
(52) U.S. Cl. .......................... 359/326; 359/327; 385/24
(58) Field of Search ................................ 359/326–332; 385/24

(56) References Cited

U.S. PATENT DOCUMENTS

| 4,764,930 | A | | 8/1988 | Bille et al. ..................... 372/23 |
| 5,099,147 | A | * | 3/1992 | Gregor et al. ............... 359/327 |
| 5,436,757 | A | * | 7/1995 | Okazaki et al. ............. 359/332 |
| 5,463,493 | A | | 10/1995 | Shah .......................... 359/312 |

(List continued on next page.)

FOREIGN PATENT DOCUMENTS

| JP | 11015032 | 1/1999 | ............. G02F/1/35 |
| WO | WO 98/27406 | 6/1998 | .......... G01D/5/353 |
| WO | WO 0004669 | 1/2000 | ............ H04J/14/02 |
| WO | WO 0103254 | 1/2001 | |

OTHER PUBLICATIONS

*Frequency Comb Generation by Four–Wave Mixing and the Role of Fiber Dispersion*, George A. Sefler and Ken–ichi Kitayama, Journal of Lightwave Technology, vol. 16, No. 9, Sep. 1998, pp. 1596–1605.

(List continued on next page.)

*Primary Examiner*—John D. Lee
(74) *Attorney, Agent, or Firm*—Jenkens & Gilchrist

(57) ABSTRACT

A system for converting a single input beam of light into a plurality of spatially or angularly shifted output beams, each having a different wavelength supplies the single input beam of light to the first of a plurality of cascaded acousto-optical and/or stimulated Brillouin scattering (SBS) wavelength-shifting devices in optical communication with each other. This causes the first wavelength-shifting device to produce a first output beam having a wavelength shifted from that of the input beam. The output beam from each of the cascaded wavelength-shifting devices is supplied to the next such device to cause each successive wavelength-shifting device to produce an output beam having a wavelength shifted from the wavelength of the input beam to that device. Thus, variations in the wavelength of the input beam or in temperature or strain of the wavelength-shifting devices will cause the wavelengths of the output beams to uniformly vary, thus maintaining constant intra-wavelength spacings among the output beams.

47 Claims, 15 Drawing Sheets

U.S. PATENT DOCUMENTS

| | | | |
|---|---|---|---|
| 5,524,012 A | 6/1996 | Wang et al. | 372/23 |
| 5,689,363 A | 11/1997 | Dane et al. | 359/334 |
| 5,828,477 A | 10/1998 | Nilsson et al. | 359/181 |
| 5,854,802 A | 12/1998 | Jin et al. | 372/22 |
| 5,910,857 A | 6/1999 | Scott et al. | 359/338 |
| 5,930,278 A | 7/1999 | Menigaux | 372/50 |
| 5,953,139 A | 9/1999 | Nemecek et al. | 359/124 |
| 5,963,567 A | 10/1999 | Veselka et al. | 372/21 |
| 5,987,201 A | 11/1999 | Chen | 385/43 |
| 5,995,254 A | 11/1999 | Koga et al. | 359/124 |
| 5,999,291 A | 12/1999 | Anderson | 359/133 |
| 6,014,237 A | 1/2000 | Abeles et al. | 359/124 |
| 6,038,242 A | 3/2000 | Yamamoto et al. | 372/34 |
| 6,091,751 A | 7/2000 | Berger | 372/45 |
| 6,125,228 A | 9/2000 | Gong | 385/146 |
| 6,144,482 A | 11/2000 | Young et al. | 359/305 |
| 6,160,931 A | 12/2000 | Asakura | 385/24 |
| 6,163,395 A | 12/2000 | Nemecek et al. | 359/187 |
| 6,169,828 B1 | 1/2001 | Cao | 385/31 |
| 6,181,848 B1 * | 1/2001 | Bruno et al. | 385/24 |
| 6,192,058 B1 | 2/2001 | Abeles | 372/6 |

OTHER PUBLICATIONS

*1.8–THz Bandwidth, Zero–Frequency Error, Tunable Optical Comb Generator for DWDM Application*, S. Bennett, B. Cai, E. Burr, O. Gough and A. J. Seeds, IEEE Photonics Technology Letters, vol. II, No. 5, May 1999, pp. 551–553.

*Optoelectronic Synthesis of Milliwatt–Level Multi–Octave Millimeter–Wave Signals Using an Optical Frequency Comb Generator and a Unitraveling–Carrier Photodiode*, S: Fukushima, CFC, Silva, Y. Muramoto, and A.J. Seeds, IEEE Photonics Technology Letters, vol. 13, No. 7, Jul. 2001, pp. 720–722.

"*Laser Diode Module for Use as DWDM Light Source*", http://www.globalsources.com/MAGAZINE/TS/0011/NPHS104.HTM, no date.

*Multiple Wavelength Generation With Brillouin/Erbium Fiber Lasers*, Gregory J. Cowle and Dmitri Yu Stepanov, IEEE Photonics Technology Letters, vol. 8, No. 11, Nov. 1996, pp. 1465–1467.

* cited by examiner

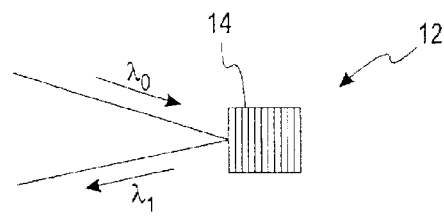
FIG. 7
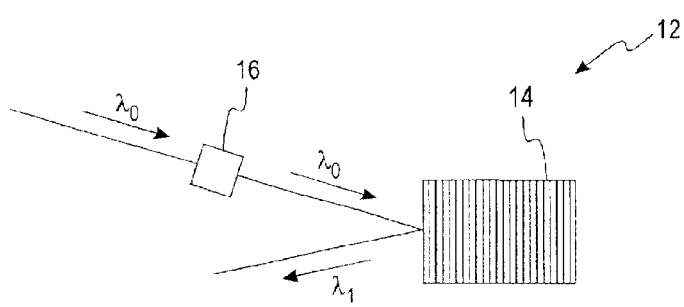
FIG. 8
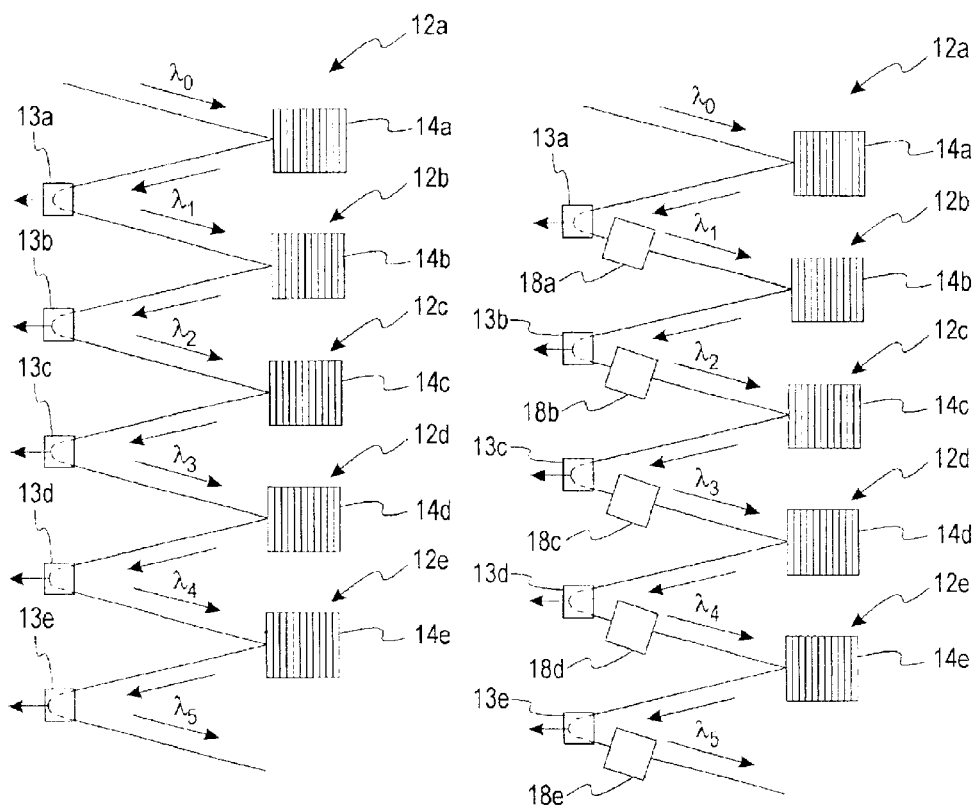
FIG. 9
FIG. 10

OPTICAL SYSTEM FOR CONVERTING LIGHT BEAM INTO PLURALITY OF BEAMS HAVING DIFFERENT WAVELENGTHS

FIELD OF THE INVENTION

The present invention relates to optical systems generally operating with many wavelengths, and to optical systems used, for example, in communication systems.

BACKGROUND OF THE INVENTION

Many optical systems require the use of a series of wavelengths. These different wavelengths are generally referred to as "channels." For example, Dense Wavelength Division and Multiplexing (DWDM) communication systems exploit numerous different wavelengths in order to increase the throughput of the communication system. Other such systems include Differential Absorption Lidar (DIAL) systems, which are used for monitoring pollutants or small quantities of gases in the air. In these systems, the measurement is performed by transmitting beams having a multitude of closely spaced wavelengths, and afterwards detecting the backscattered beams. Generally, one of the beams, having a specific wavelength, is absorbed by a specific substance on the optical track, and the amount of absorption is measured by the ratios of the amplitudes of the backscattered beams.

In general, each single wavelength is obtained from a single source, which is usually a laser source, and the number of required sources is the number of different wavelength channels. Both the central wavelength of each channel and the wavelength variations, are determined by the properties of a specific source. Thus, in order to prevent overlapping of two adjacent wavelength channels, the spacing between these channels must be larger than the wavelength variations or tolerance of each single channel. The wavelength variations result mainly from temperature changes, but are also susceptible to opto-mechanical instabilities and fabrication tolerances. Since the wavelength range of an optical system is generally limited, the wavelength variations in such systems limit the total number of possible channels.

When operating a system wherein each wavelength channel is generated by a different light source or when there is a need in backup sources, an identical light source should be available in stock, which is costly. Alternatively, all of the channels could operate with a similar light source which has a tunable wavelength in a certain range and is fixed to a different wavelength for each channel. Here again, the tunability significantly increases the cost of the light source.

Some systems, in which one fiber laser source provided several wavelength channels with equal spacing between them, have been investigated in the past. However, in such fiber lasers, a single output beam is produced which consists of a multitude of wavelengths. Thus, the different wavelength channels are not separated either spatially or angularly and cannot be separately modulated.

In the optical receiver of multi-wavelength communication systems, it is generally required to split the incoming signal (composed of a multitude of wavelengths), into a multitude of channels, each having a single wavelength. This process is referred to as "optical de-multiplexing." Several methods are widely used for de-multiplexing. These include exploitation of diffraction gratings, either inside optical fibers (known as "fiber Bragg gratings"), in a waveguide or in free space, the exploitation of prisms, the exploitation of interferometers, or other spectral filters.

SUMMARY OF THE INVENTION

The present invention provides an optical system, which includes a single light source (for example, a laser), from which emanates a series of spatially or angularly separated beams, each having its own wavelength. The spacings between the wavelength channels can be predetermined and stabilized. These spacings remain fixed during temperature changes and wavelength variations of the input light source. Also, the system provides controllable de-multiplexing methods for separating an optical signal with a plurality of wavelengths into a set of separated wavelengths.

The multi-wavelengths light source device is based on non-linear optical processes, such as acousto-optical effects and/or stimulated Brillouin scattering (SBS). In these non-linear optical effects, an incident beam with wavelength $\lambda_i$ is transformed by means of reflection or scattering into a beam having a wavelength $\lambda_s$ which is slightly different than $\lambda_i$. The wavelength difference $\lambda_s-\lambda_i$ is determined by the properties of the acousto-optical device or by the properties of the SBS material, (namely, $v_B=2nV_A/\lambda$, where $v_B$ is the frequency shift, n is the refractive index, $V_A$ is the speed of sound and $\lambda$ is the wavelength), and generally changes with temperature or strain. The acousto-optical or SBS device can be a solid bulk material such as glasses or quartz, a liquid, an optical fiber, or another material with acoustic properties.

In order to obtain efficient SBS devices, certain limitations of the SBS materials and the input beam power should be overcome. Specifically, the power intensity (watts/mm$^2$) of the input beam should be higher than a threshold value. Generally, when operating with a bulk material SBS device, the threshold is relatively high, so pulse operation is preferably used. However, when using optical fibers, significantly lower threshold power is required. These powers can be readily obtained with continuous wave operation. Moreover, fibers with special characteristics, such as small core cross-sectional area, have even lower threshold powers, so they are more efficient for usage as SBS devices. These fibers include dispersion-compensated fibers (DCFs), or photonic-bandgap fibers.

In order to obtain a series of separated beams, each having a different wavelength, a cascaded configuration of acousto-optical or SBS devices is utilized. Specifically, the output beam of each of the acousto-optical or SBS devices may serve two functions: First, the beam, or a part of it, may serve as an output wavelength channel of the system. Second, the beam, or a part of it, may serve as an input wavelength to another acousto-optical or SBS device, in order to obtain the next wavelength in the series. Such a cascaded configuration may be repeated many times. To compensate for the power losses in the system which arise due to scattering, and the imperfect efficiency of the various components, it is possible to add optical amplifiers next to (either before or after) each acousto-optical or SBS device, or next to a series of a few such devices.

Generally, SBS devices operate as reflecting devices, so the output beam generally propagates in a direction opposite to the input beam. In order to separate the output beam from the input beam, it is possible to utilize a 2×1 beam splitter or an optical circulator, so that nearly all the power of the output beam is directed to a different direction from the input beam. By selecting proper materials, it is possible to design specific frequency shifts for the SBS process. Thus, one can obtain predetermined spacings.

The embodiments proposed and presented herein minimize the temperature dependence of the system, and thus allow the system to operate with nearly fixed spacings at a wide temperature range. These embodiments include the combination of SBS devices and acousto-optical devices, whose wavelength spacings each vary differently (e.g., one increases and the other decreases) with temperature. Similarly, two or more SBS devices, composed of two or more different materials, some having a refractive index which increases with temperature (positive dn/dT) such as quartz or BK series Schott glass, and others having a refractive index which decreases with temperature (negative dn/dT), such as FK or PK series Schott glasses, may be used. In this manner, the total wavelength spacing remains fixed although the individual spacings change with temperature.

Another embodiment of the invention exploits both the temperature and the strain dependence of the refractive index. Here, an optical fiber is wound on a spool. Temperature changes cause two effects: first, according to the fiber material composition, the refractive index of the optical fiber changes with temperature; second, the strain induced on the fiber, and thereby again the refractive index, changes as the spool expands or contracts with temperature. By a proper selection of the spool material composition, having different expansion coefficients, the expansion, and thereby the strain, are controlled independently of the fiber material. Thus, the two effects (strain and temperature dependence) are designed to cancel each other, leading to nearly fixed wavelength spacing with temperature.

The cascaded system is capable of creating a series of hundreds, or even thousands, of wavelengths. The spacings between every two neighboring wavelengths can be predetermined by a specific acousto-optical or SBS device, so that the series of wavelengths may have either equal spacings, or different, predetermined and stabilized spacings. The system can operate either with a continuous wave (CW), single pulse, or repetitive pulses (RP).

Cascading is not limited to a single material or a single spacing. The case where a single wavelength is split in energy to serve as a source for at least two new cascades is of interest. By generating two or more cascades, each of which has a different wavelength spacing, e.g., spacing A and spacing B, and by selecting random wavelengths from these cascades, a new cascade can be generated having a wavelength spacing equal to the difference between the spacings of the two cascades, namely, A–B or other combinations.

A backup to the first source laser may be provided. Since the amplifiers in the light source operate with multiple pump diodes, their reliability is relatively high, and thus a first source laser is one of the least reliable components in the system. Thus, another such laser source may be used in parallel with the first laser source. This backup laser source is activated immediately when the first laser source fails, leading to an immediate replacement in case of system failure.

As the reliability and continuous operation of optical transmission systems are important, a backup for system malfunctions, which mostly occur in active components, is advantageous. Accordingly, a tunable laser source may be provided as backup to the multi-wavelengths source. When an internal failure occurs, the tunable source is tuned either to the first wavelength that is missing, or to the next one, so that, in the worst case, only one wavelength will be missing in the whole system.

Another embodiment of the invention comprises an architecture which reduces the total number of components. Here, there is provided a multi-cascaded design, in which the output from the Nth stage is input again to the first stage. In this manner, each output beam is composed of a series of different wavelengths. Due to the relatively large spacing between the different wavelengths in the same fiber, these wavelengths can be relatively easily separated by means of conventional optical de-multiplexing devices.

Another embodiment of the invention comprises a seeding mechanism to some or all of the wavelengths. Here, a light source (for example, a laser, a light emitting diode, or an amplified spontaneous emission source) is connected to the end of one or more of the Brillouin devices propagating in the opposite direction to the incident beam). The light source emits light at the shifted wavelength. The beam emitted from the light source (namely, the seed beam), enhances the power and/or the stability of the beam emitted from the Brillouin device. Even a low-power seed beam is efficient. Thus, one can either use a seed beam from a separate source for each Brillouin device, or seed beams for a few Brillouin devices may originate from a single broad-spectrum light source producing a beam that is divided by means of optical couplers or filters.

Each output beam, which is spatially separated from the other beams and has a specific stabilized wavelength, can be separately modulated by using a dedicated modulator. Alternatively, groups of output beams can be modulated together by the same modulator, to obtain a broadcast-like transmission.

The active control of the de-multiplexing system is performed by using one of the multitudes of wavelength channels as the control channel. Since the spacings between the different wavelengths are well-known, by locking on the control wavelength channel, all other wavelength channels are also locked, and thus can be readily obtained.

The actuator in the closed control loop slightly changes the properties of the optical demultiplexer, namely, by slightly shifting each of the receiver wavelength channels. This is obtained by either using an actuator, e.g., a piezo-electric or magnetic restrictive actuator to tilt, strain or move a grating, or to use such an actuator to slightly tilt or move the output waveguide or the fiber output array, or by slightly changing the wavelengths of the input beam using a wavelength-shifting device, such as an acousto-optical device.

As a result, small changes or deviations in the input wavelength, caused mainly by small variations in the first laser source, can be compensated for by active control of the optical de-multiplexing system. To compensate for such unknown and relatively slowly varying wavelength, closed-loop control is utilized. This control can be based on an actuator, by maximizing the output in the control channel, whose input signal characteristics are well known. Alternatively, this could be performed by receiving the control channel with two detectors having slightly different reception wavelengths, one of which is slightly higher than that of the desired control channel wavelength, and the other of which is slightly lower, and equalizing the output.

Thus, the present invention provides an optical system for transmitting and receiving multiple wavelengths. The transmission sub-system is based on connecting a single input beam of light having into a plurality of spatially or angularly shifted output beams, each having a different wavelength, the system comprising an array of a plurality of acousto-optical and/or stimulated Brillouin scattering (SBS) devices in optical communication with each other, whereby variations in the wavelength of said input beam or in temperature or strain of said devices will cause the wavelengths of said output beams to uniformly vary, thus maintaining constant intra-wavelength spacings between said output beams. The receiving sub-system is based on feedback-controlled optical de-multiplexing.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of a stimulated Brillouin scattering (SBS) device;

FIG. 2 is a schematic illustration of an SBS device along with an optical beam splitter or circulator;

FIG. 3 is a schematic illustration of an SBS device along with an optical beam splitter or circulator and an optical amplifier;

FIG. 4 is a schematic illustration of cascaded SBS devices composed of spooled optical fibers, along with optical beam splitters or circulators;

FIG. 5 is a schematic illustration of cascaded SBS devices composed of two different materials, along with optical beam splitters or circulators;

FIG. 6 is a schematic illustration of cascaded SBS devices composed of two different materials, along with optical beam splitters or circulators and optical amplifiers;

FIG. 7 is a schematic illustration of an acousto-optic wavelength-shifting device;

FIG. 8 is a schematic illustration of an acousto-optic wavelength-shifting device along with an optical amplifier;

FIG. 9 is a schematic illustration of cascaded acousto-optic wavelength-shifting devices;

FIG. 10 is a schematic illustration of cascaded acousto-optic wavelength-shifting devices along with optical amplifiers;

FIG. 11 is a schematic illustration of an optical parametric oscillator (OPO) device;

Figure 12:
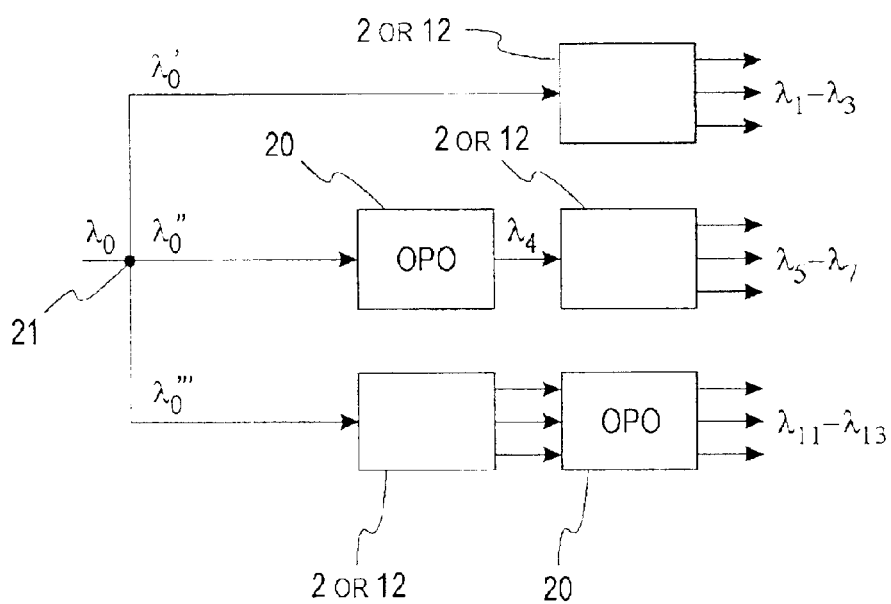
Figure 13:
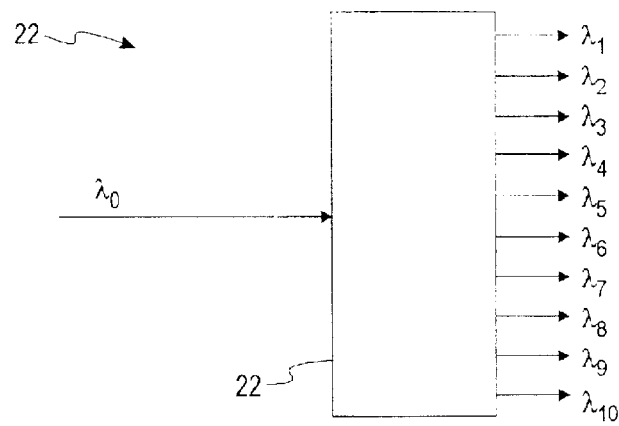
Figure 14:
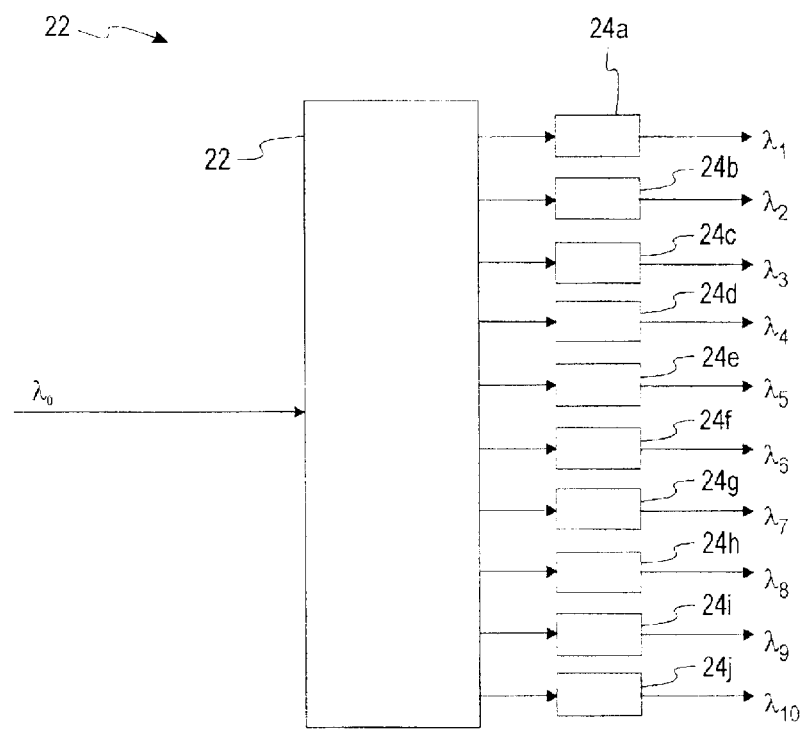
Figure 15:
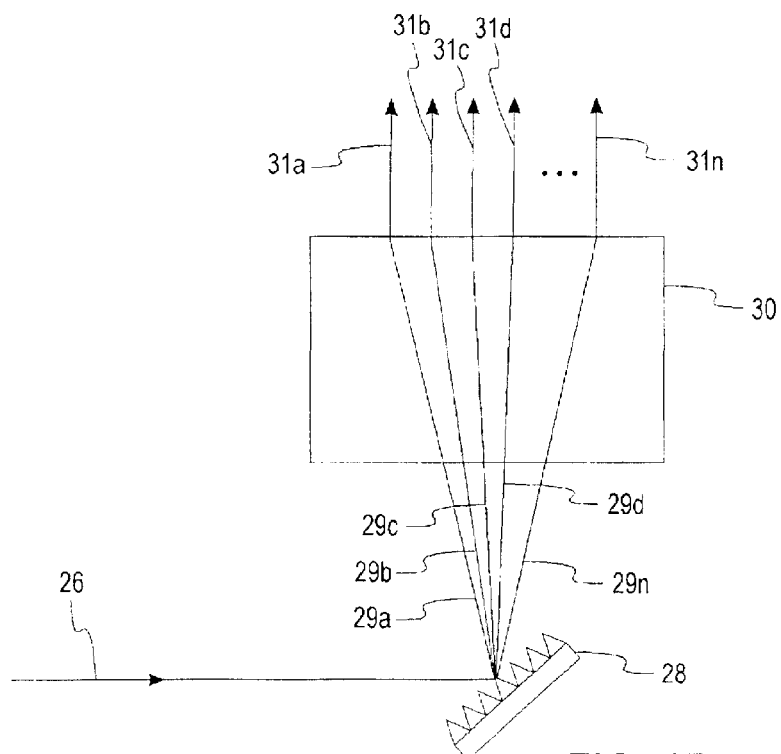
Figure 16:
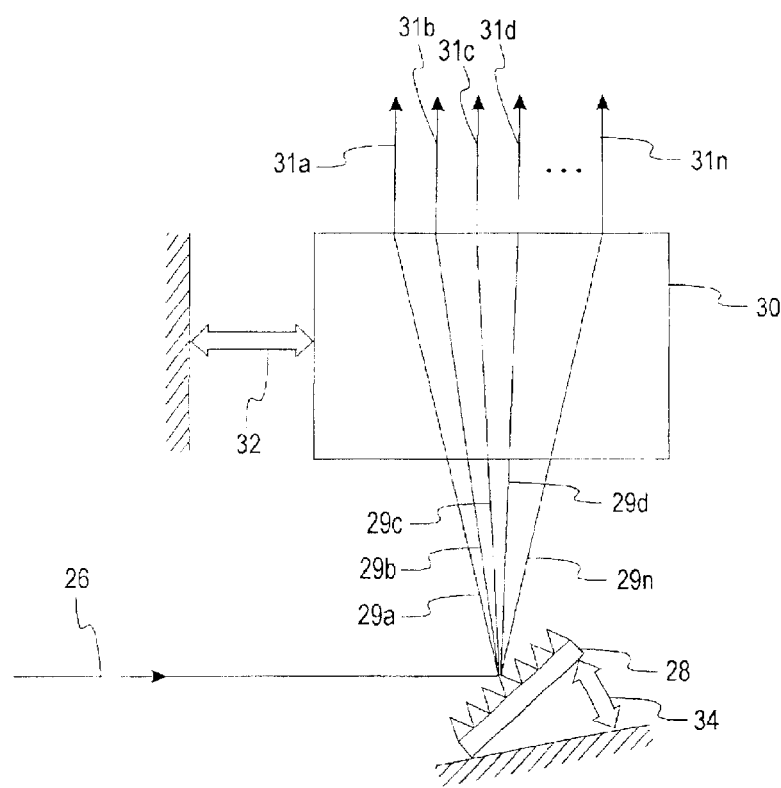
Figure 17:
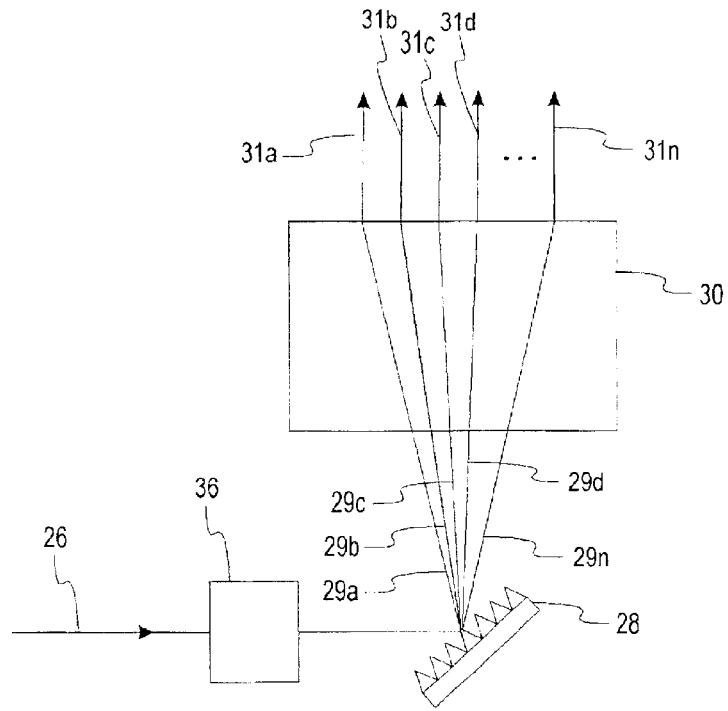
Figure 18:
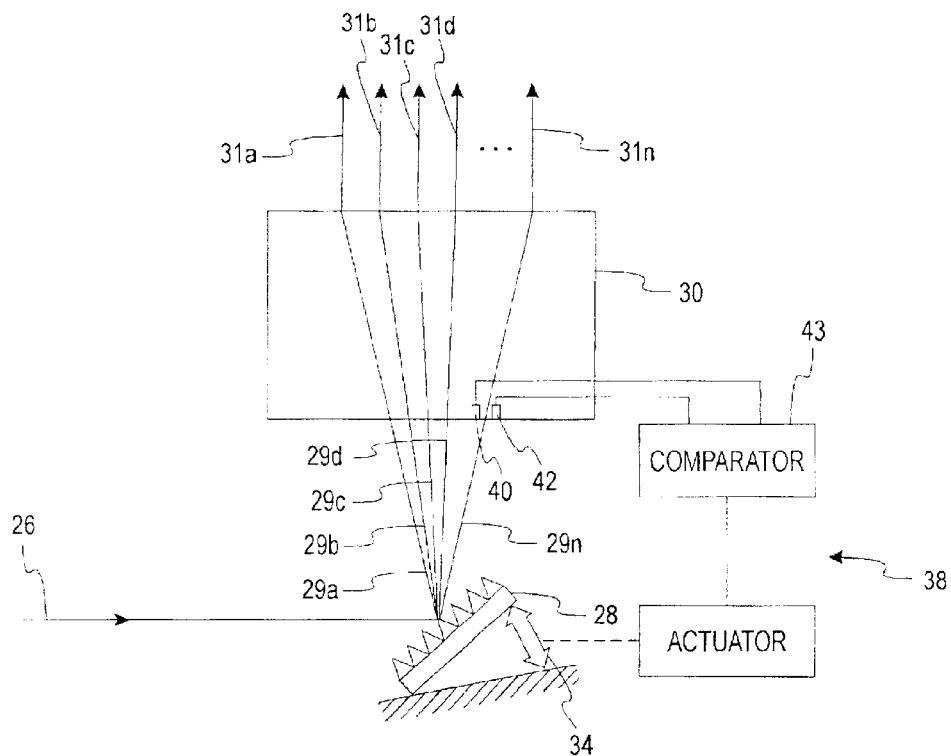
Figure 19:
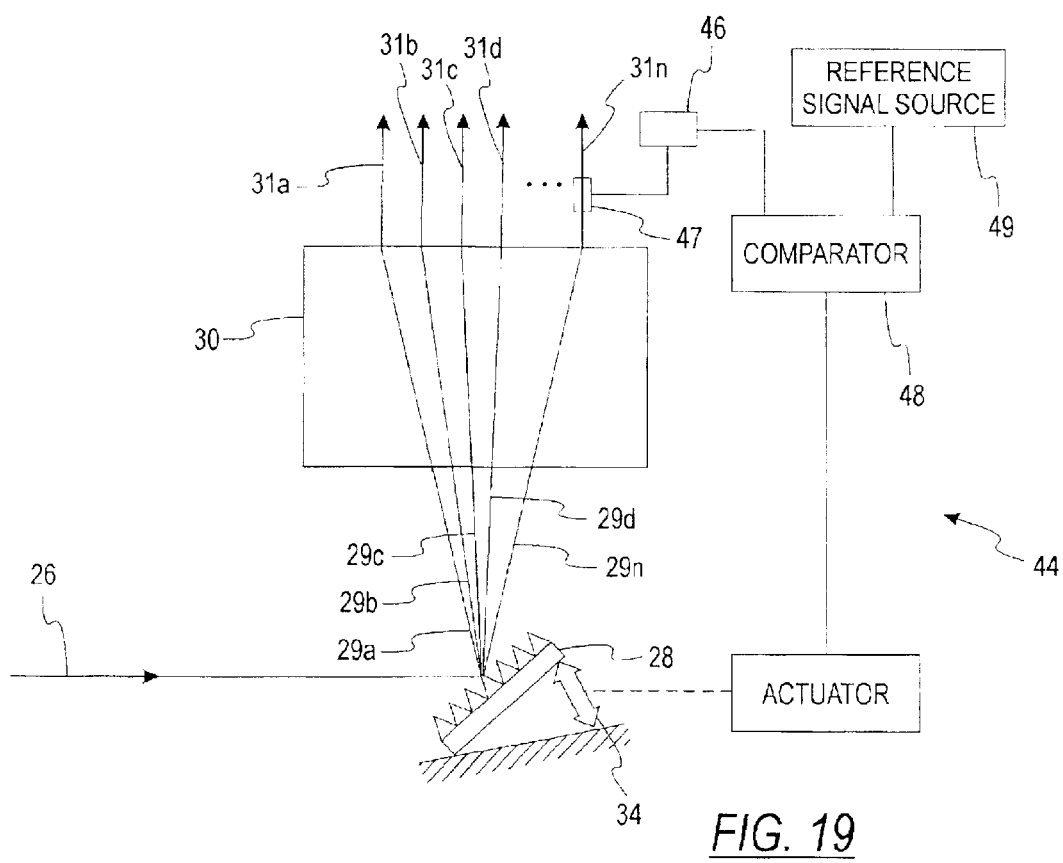
Figure 20:
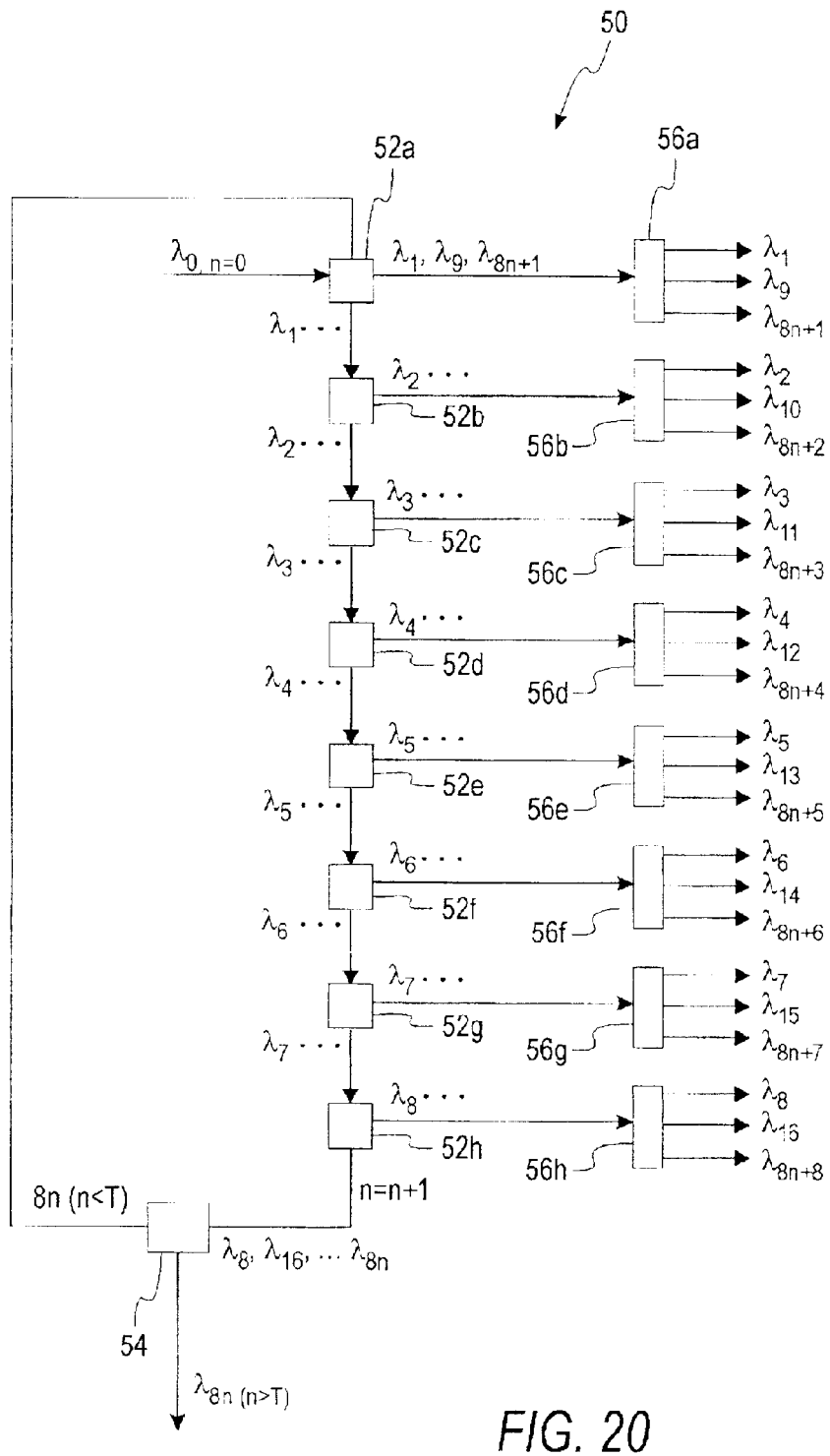
Figure 21:
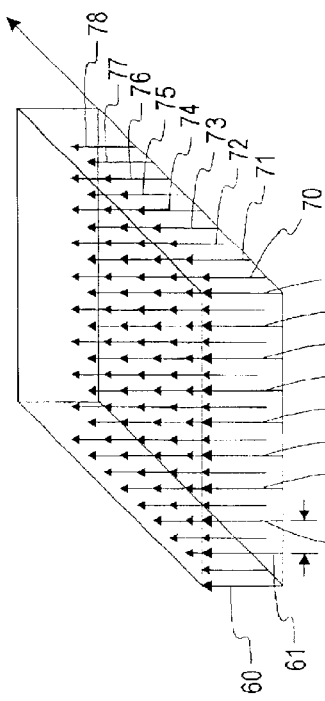
Figure 22:
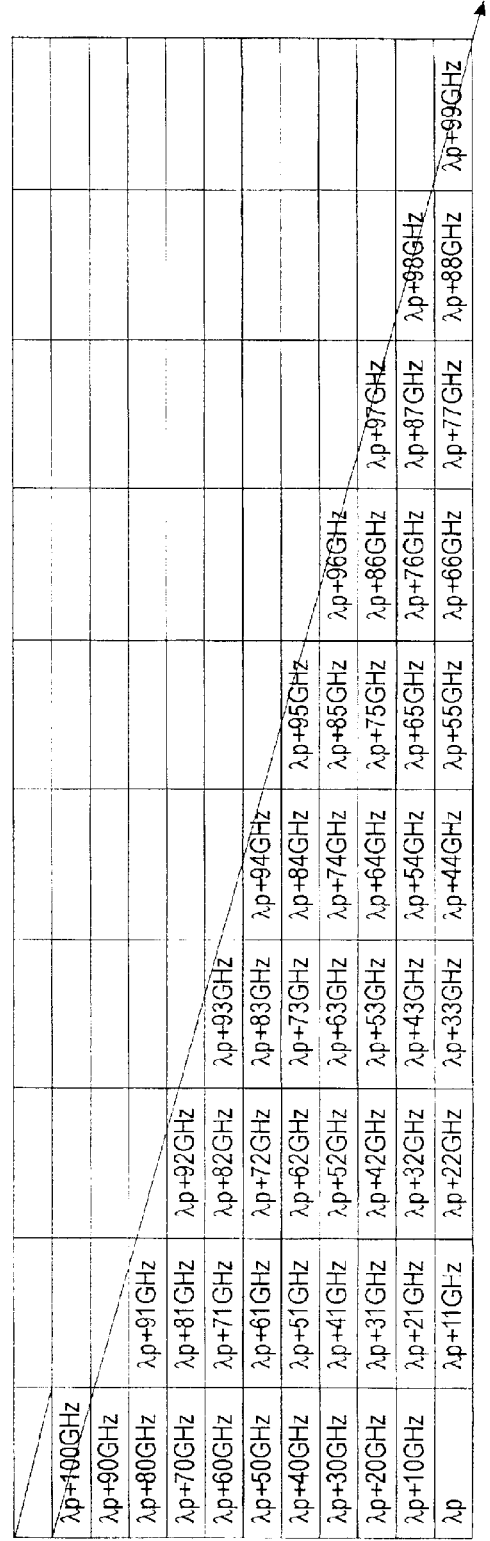
Figure 23:
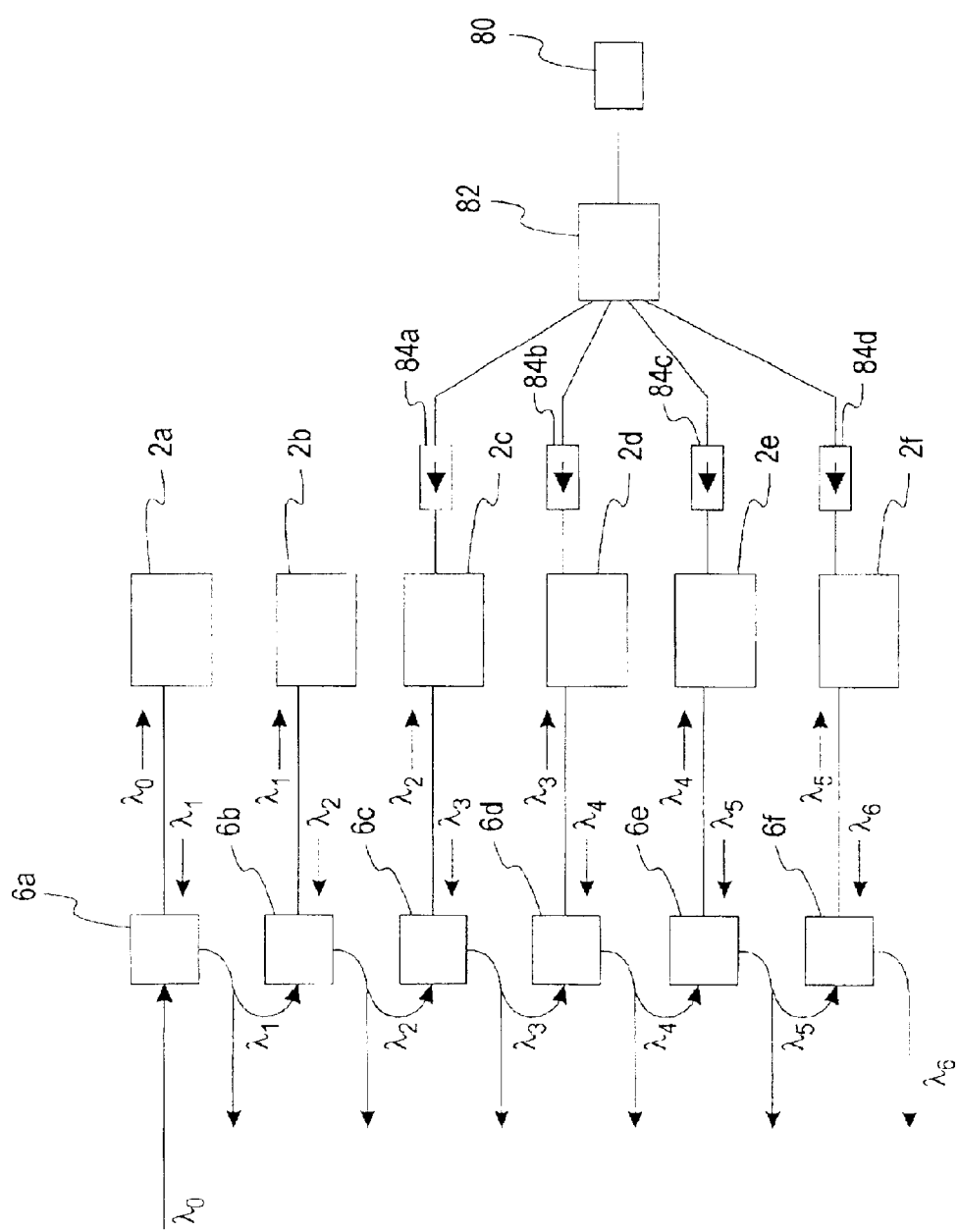
Figure 24:
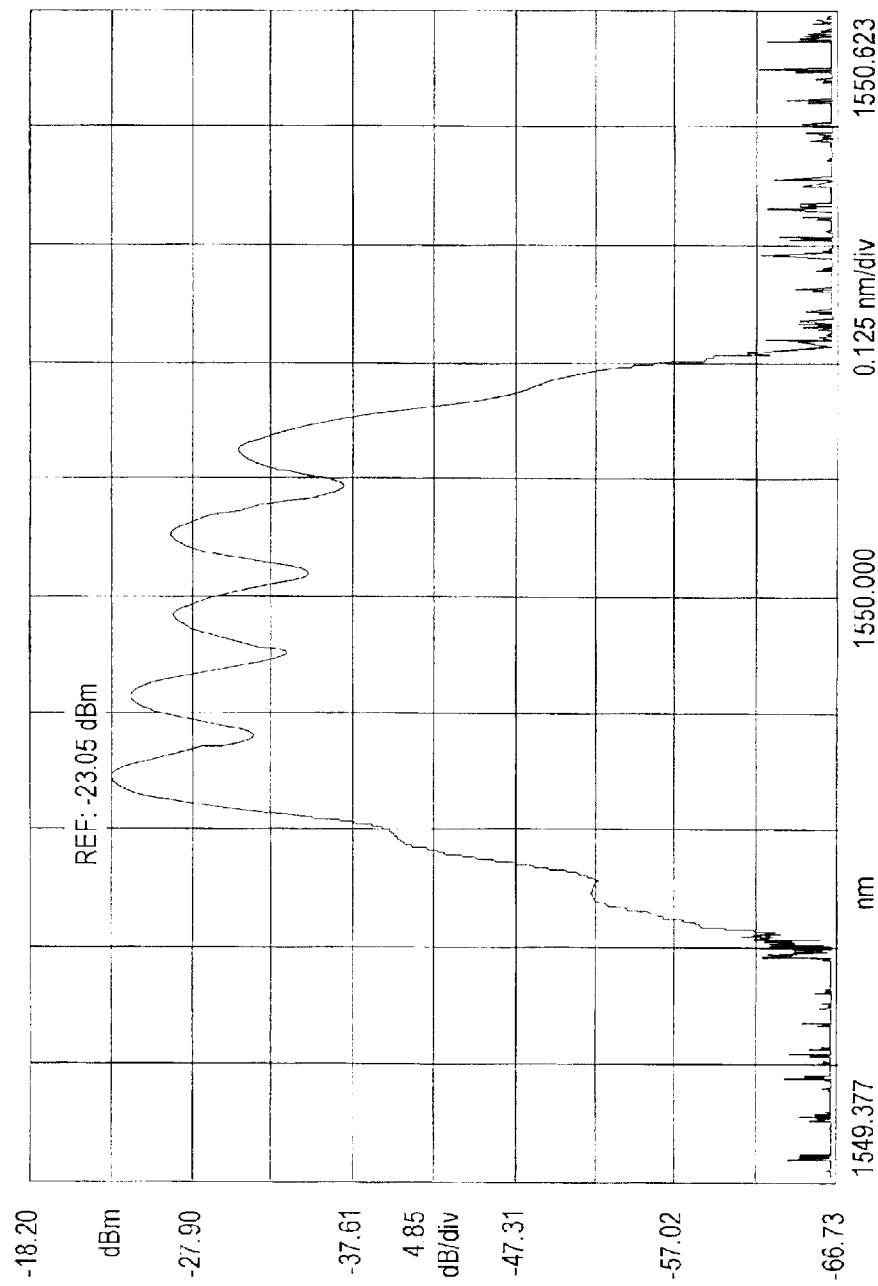
Figure 25:
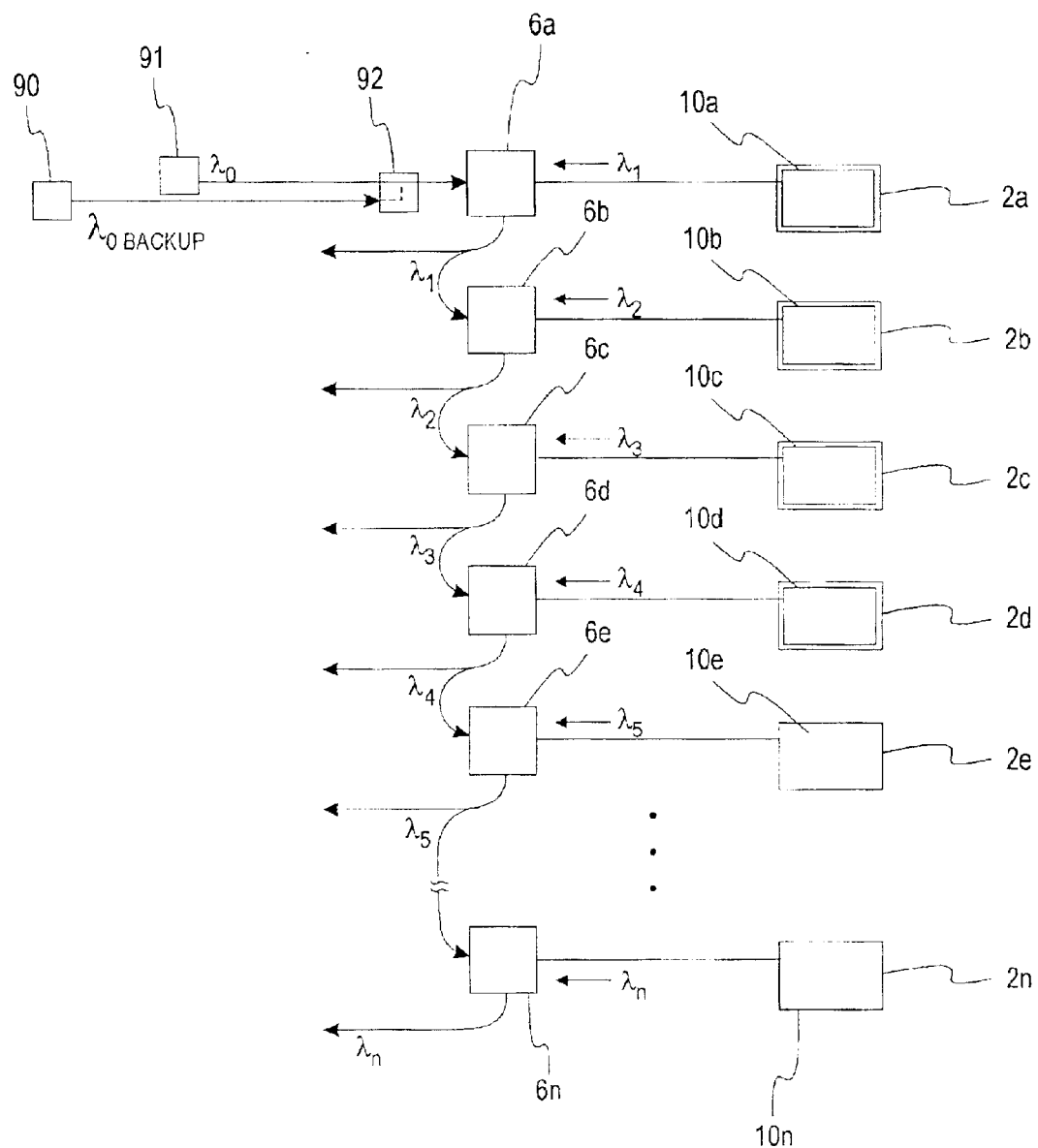
Figure 26:
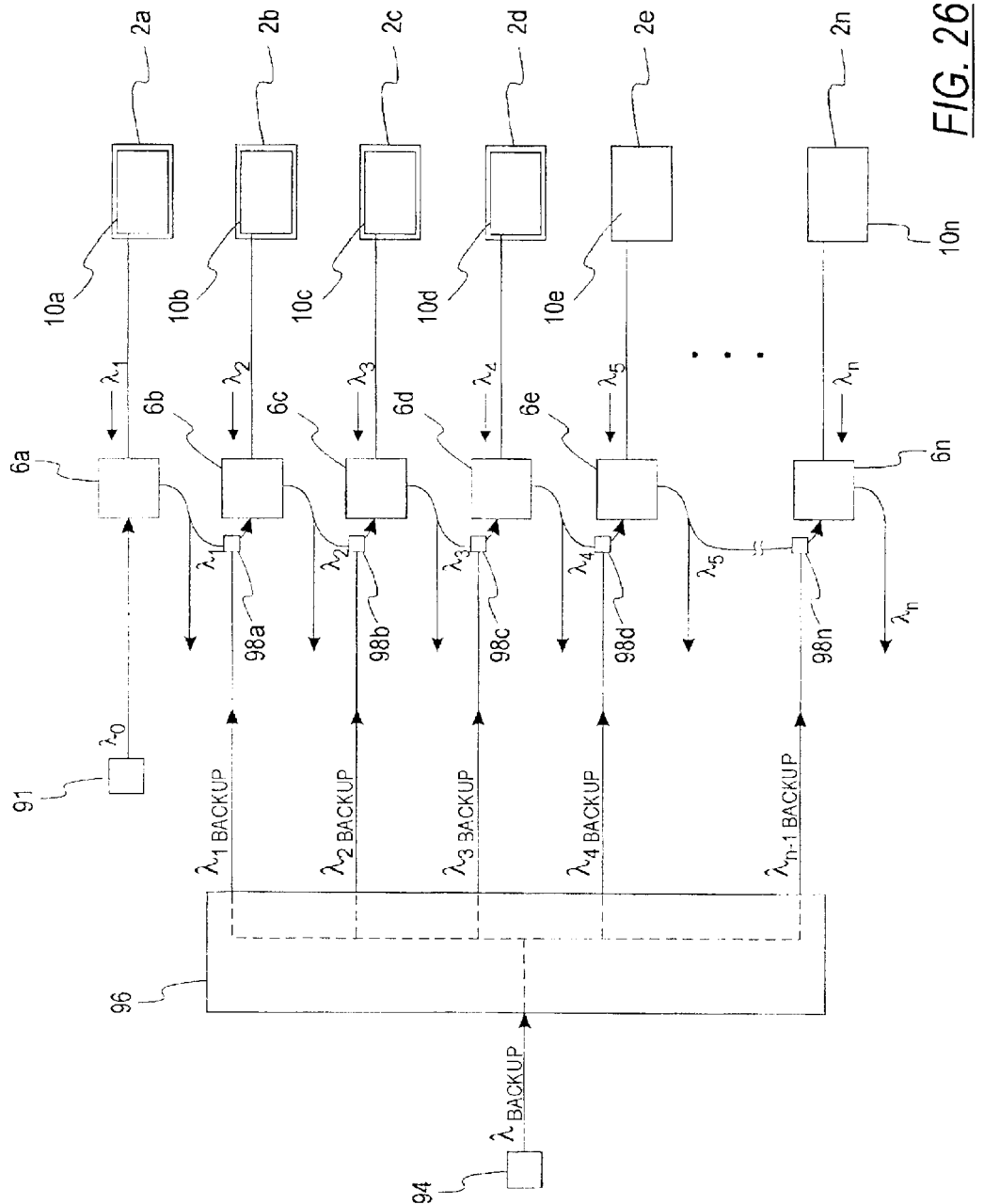

FIG. 12 is a schematic illustration of a combination of OPO devices and either cascaded SBS devices or cascaded acousto-optic wavelength-shifting devices;

FIG. 13 is a schematic illustration of a system for obtaining a multitude (10, in the specific example) of separated beams, each having each a different wavelength, out of a single input wavelength;

FIG. 14 is a schematic illustration of a system for obtaining a multitude (10, in the specific example) of separated output beams, each having a different output wavelength, each of which is modulated by a separate modulator, out of a single input wavelength;

FIG. 15 is a schematic illustration of an optical demultiplexer system;

FIG. 16 is a schematic illustration of an optical demultiplexer system having a device for tilting the receiver and a wavelength-shifting device;

FIG. 17 is a schematic illustration of an optical demultiplexer system having a wavelength-shifting device;

FIG. 18 is a schematic illustration of an optical demultiplexer system having a feedback-controlled tunability;

FIG. 19 is a schematic illustration of another embodiment of an optical demultiplexer system having a feedback-controlled tunability;

FIG. 20 is a schematic illustration of a multi-cascaded optical system for producing multiple wavelengths;

FIG. 21 is a schematic illustration of type 1 and type 2 wavelength cascades;

FIG. 22 is a table illustrating a combined 1 GHz step cascade;

FIG. 23 is a schematic illustration of a modified embodiment of the invention utilizing an additional light source for seeding;

FIG. 24 is a graph showing the optical spectrum of 5 lines generated in a cascaded configuration;

FIG. 25 is a schematic illustration of a system with a backup to the first laser source; and FIG. 26 is a schematic illustration of a system with a tunable laser for system backup.

DETAILED DESCRIPTION OF PREFERRED EMBODIMENTS

Figure 1:
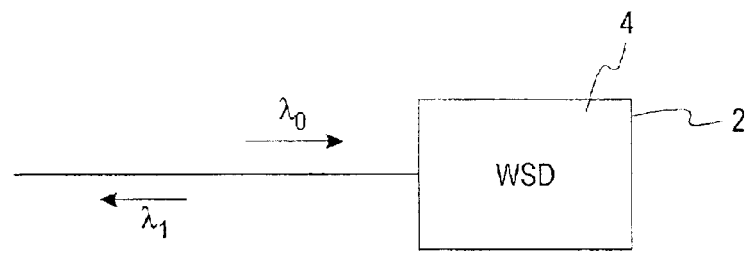

Reference is now made to FIG. 1, which is a schematic illustration of a stimulated Brillouin scattering (SBS) wavelength-shifting device 2. An incident beam of wavelength $\lambda_0$ propagates from left to right towards an SBS device 2 made of a material 4, which material could be constituted by an optical fiber, a bulk material, a liquid, or other optical material. Due to SBS, a reflected beam with a slightly different wavelength $\lambda_1$ emerges back from the SBS material 4. The fibers to be used may have a small core area and may be selected from the group comprising photonic bandgap fibers, dispersion compensating fibers, or high numerical aperture fibers. One example of a suitable laser to generate the incident beam of wavelength $\lambda_0$ is S3FC1550 made by Thorlabs in New Jersey. One example of a suitable high numerical aperture fiber is a 500 m long fiber having a 3 $\mu$m core diameter made of $GeO_2$ doped silica (approximately 35% by weight) and having a refractive index of 1.479 and a cladding made of silica and having a refractive index of 1.447. When this fiber receives a light beam having a wavelength $\lambda_0$ of 1550 nm. at a power level above its threshold value, it produces a reflected beam having a wavelength $\lambda_1$ of 1550.075 nm. The difference $\Delta\lambda$ between the two wavelengths is 0.075 nm. This particular fiber has an SBS threshold of about 100 miliwatts, and thus it produces a shifted reflected beam in response to any incident beam having an input power above the threshold value.

Figure 2:
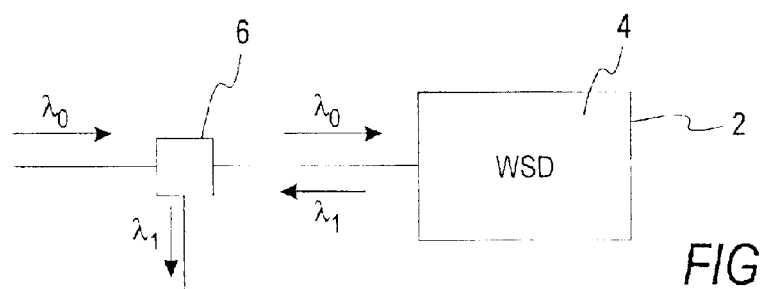

FIG. 2 shows a schematic illustration of an SBS device 2 with an optical beam splitter or circulator 6, in which, similar to the device of FIG. 1, an incident beam of wavelength $\lambda_0$ propagates from left to right. The beam passes through the optical beam splitter or circulator 6, towards the SBS material 4. Here again, a reflected beam of wavelength $\lambda_1$ is created. The optical beam splitter or circulator 6 does not transmit the reflected beam, but rather reflects it to a different path, schematically shown as downwards. One example of a suitable splitter or circulator when operating in the wavelength range of 1530 mn to 1570 nm are the Models 10202A splitter or 6015-3 circulator available from Thorlabs in New Jersey.

Figure 3:
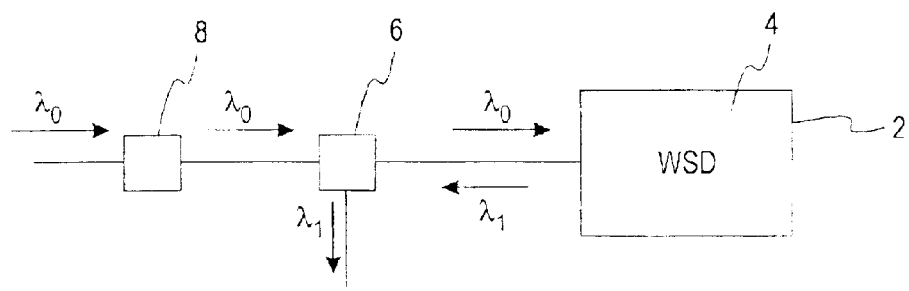

A configuration which also includes an optical amplifier 8, is shown in FIG. 3. Here, the incident beam (at the left) of wavelength $\lambda_0$ has relatively low power. Thus, it is propagated through an optical amplifier 8, which could be an optical fiber, a bulk material or other optical material, to obtain a beam having the same wavelength but higher power. This higher power beam is then incident on an SBS device 2, similar to that shown in FIG. 2. One example of a suitable optical amplifier when operating in the range of 1530 nm to 1565 nm is the Model AMP-FL8011-CB-21 amplifier available from Thorlabs in New Jersey.

Figure 4:
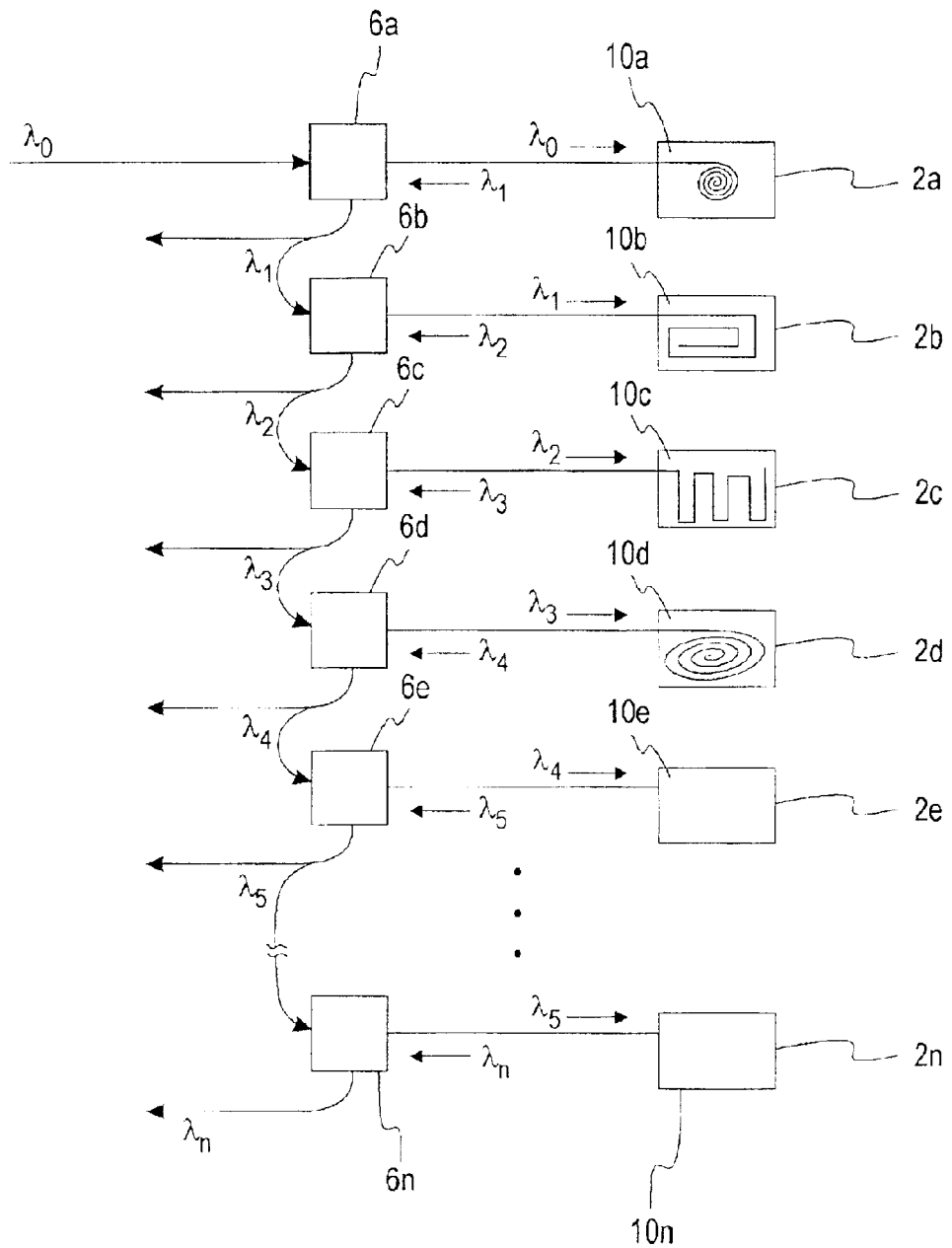

FIG. 4 is a schematic illustration of a cascaded system according to the present invention, comprising a plurality of SBS devices 2a–2n each of which receives an input beam from one of a plurality of splitters 6a–6n. Each output beam having a specific wavelength, emerging from an SBS device 2, serves both as one of the output beams $\lambda_1$–$\lambda_n$ for the cascaded system, and as a source beam for the next SBS device in the cascade. In this manner, multiple beams $\lambda_1$–$\lambda_n$, each having a distinct wavelength, are obtained. Here, each of the individual SBS devices 2a–2n may be composed of an optical fiber wound around a spool to form a fiber coil 10a. For example, when the incident light beam for the first SBS device 2a has a wavelength $\lambda_0$ of 1550 nm., a suitable SBS device is formed by winding 500 turns of the optical fiber identified above on a cylindrical core having a diameter of 15 cm with little or no tension on the fiber in the final coil 10a.

Instead of a coil 10a, the same effect can be achieved by an optical fiber, or any other flexible, semi-rigid or rigid waveguide providing a continuously patterned optical path in any desired configuration. For example, the fiber may follow a spiral path as in the case of fiber 10d in FIG. 4, or a meandering path as in the case of fiber 10c, or a path following straight lines as in the case of fiber 10a. Temperature stabilization is obtained by the proper design and selection of the fiber material parameters (mostly temperature dependence of the refractive index) and the spool materials (mostly expansion coefficients) and dimensions.

In one example of the system illustrated in FIG. 4, an incident beam having a wavelength $\lambda_0$ of 1550 nm. produces a "comb" of output signals having wavelengths $\lambda_1$–$\lambda_n$ of 1550.075 nm, 1550.150 nm, 1550.225 nm, 1550.300 nm, 1550.375 nm, etc. The relative spacing of the output signals in this comb remains stable up to ±0.005 nm over a temperature range of 0 to 40° C. The entire comb might shift due to wavelength changes of the source, caused by fluctuations in temperature, but the spacing between the multiple signals comprising the comb remains stable. An illustration of experimental results showing 5 output lines is shown in FIG. 23.

Figure 5:
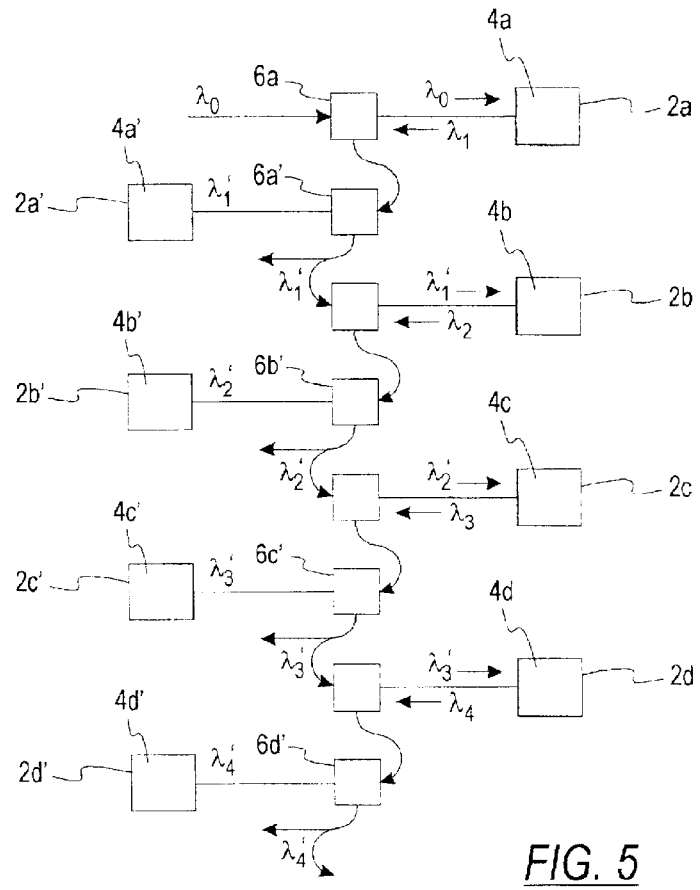

FIG. 5 is a schematic illustration of a cascaded configuration of SBS devices 2a–2d, each of which comprises first and second wavelength-shifting components, such as 2a and 2a', connected in series and having refractive indices that vary in opposite directions in response to temperature changes. Thus, the alternating devices 2a and 2a', 2b and 2b', 2c and 2c', and 2d and 2d' are composed of two different materials such as 4a and 4a', one having a refractive index increasing with temperature, and the other having a refractive index decreasing with temperature. An incident light beam of wavelength $\lambda_0$ is applied to SBS material 4a to produce a reflected beam of wavelength $\lambda_1$. This reflected beam is then applied to the second SBS material 4a' via first and second splitters 6a and 6a' to produce a second reflected beam of wavelength $\lambda_1'$. This second beam is removed by the second splitter 6' to produce a first output of wavelength $\lambda_1'$. In this embodiment, temperature-constant shifts or spacings are obtained because any shift in the wavelength $\lambda_1$ due to a temperature change that alters the refractive index of material 4a, is substantially nullified or cancelled by a similar shift in the wavelength $\lambda_1'$ in the opposite direction due to the effect of that same temperature change on the refractive index of material 4a'. For example, the two materials 4a and 4a' may be BK10 and PK50 Schott glasses, which have refractive indices that increase and decrease with temperature as follows:

Table of Absolute Refractive Indices Change with Temperature

| | material. | dn/dT |
|---|---|---|
| Material 4a | BK10 | $+1.6 \times 10^{-6}$ °C.$^{-1}$ |
| Material 4a' | PK50 | $-1.6 \times 10^{-6}$ °C.$^{-1}$ |

As the refractive index n of the material of the first set of devices 2a–2d increases with temperature, the wavelength shifts of the reflected output signals $\lambda_1$–$\lambda_4$ produced by those devices increase proportionally to the increase in n. Conversely, as the refractive index n of the material of the second set of devices 2a'–2d' decreases with temperature, the wavelengths shifts of the reflected output signals $\lambda_1'$–$\lambda_4'$ produced by those devices decrease proportionally to the decrease in n. Thus, the wavelength shift of the output of the first device 2a increases while the wavelength shift of the output of the second device 2a' decreases. The sum of the shifts remains substantially constant with temperature, resulting in substantially temperature-independent wavelengths.

Figure 6:
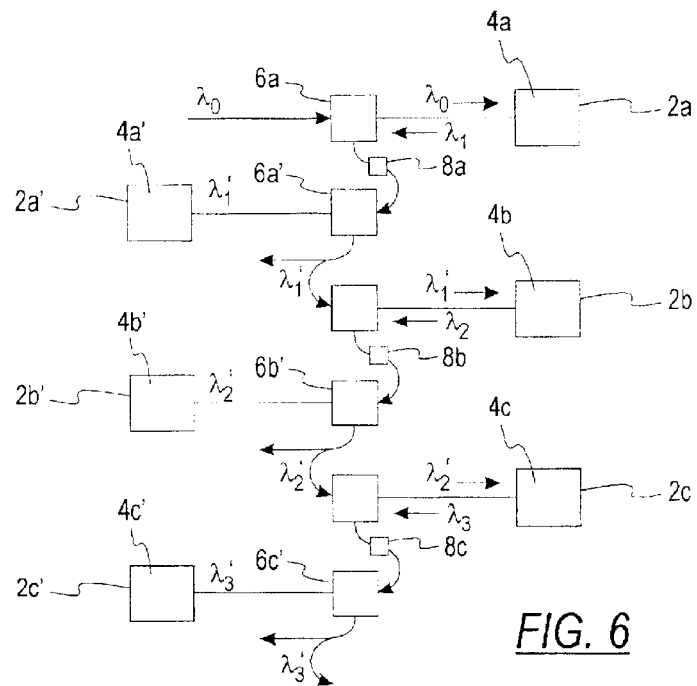

FIG. 6 shows a cascaded configuration similar to that of FIG. 5, with optical amplifiers 8a–8c added between the two splitters associated with each pair of different SBS devices, such as the two splitters 6a and 6a' associated with the pair of SBS devices 2a and 2a'. Other numbers and placements of amplifiers 8 along the beam paths are also possible.

FIG. 7 illustrates an acousto-optical wavelength-shifting device 12, in which an input beam of wavelength $\lambda_0$ is incident upon an acousto-optical material 14. The scattered or reflected beam, propagating from right to left, has a slightly different output wavelength $\lambda_1$.

A similar acousto-optical wavelength-shifting device 12, with the addition of an optical amplifier 16 for the input beam, is shown in FIG. 8. Here, the incident beam (at the left) of wavelength $\lambda_0$ has relatively low power (watts/cm$^2$). Thus, it is propagated through an optical amplifier 16 to obtain a beam having the same wavelength but higher power. This higher power beam is then incident on an acousto-optical wavelength-shifting device 12, similar to that shown in FIG. 7, to produce an output beam of wavelength $\lambda_1$.

FIG. 9 is a schematic illustration of a cascaded configuration of acousto-optical wavelength-shifting devices 12a–12e made of acousto-optical materials 14a–14e, comprising a multiplicity of the devices shown in FIG. 7. The first device 12a receives an input beam of wavelength $\lambda_0$ and produces an output beam of wavelength $\lambda_1$. The output beams of the devices 12a–12e in the cascade are passed through respective splitters 13a–13e so that each beam becomes an output and is also used as an input beam for the next such device in the cascade, thereby producing a series of wavelength-shifted output beams having wavelengths $\lambda_1$–$\lambda_5$. Each output beam emerging from the acousto-optical wavelength-shifting devices 12a–12e has a specific wavelength, and serves both as one of the output beams for the cascaded system, and as a source beam for the next acousto-optical wavelength-shifting device 12. In this manner, multiple output beams, each having a distinct wavelength, are obtained.

FIG. 10 shows a cascaded configuration similar to that of FIG. 9, with the addition of optical amplifiers 18a–18d in the respective input lines to the individual acousto-optical wavelength-shifting devices 12b–12e following the first device 12a. A combination of acousto-optical wavelength-shifting devices, with and without optical amplifiers, is also possible.

Figure 11:
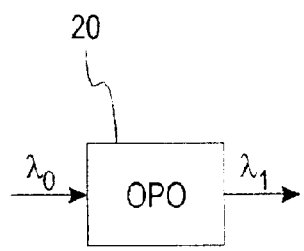

FIG. 11 is a schematic illustration of an optical parametric oscillator (OPO) 20. Here, an incident beam with a wavelength $\lambda_0$ is transformed into a beam having a different wavelength $\lambda_1$. The wavelength change effected by the OPO can be significantly larger than that obtained using SBS or acousto-optical devices. One example of a suitable OPO is KTP (available from Raicol Crystals) which produces a light beam having a wavelength $\lambda_1$ of 1540 to 1570 nm in response to an incident beam having a wavelength $\lambda_0$ of 1060 nm.

FIG. 12 illustrates a system having a combination of OPOs 20 and wavelength-shifting devices that can be either SBS devices 2 or acousto-optical devices 12. Here, a single input beam, of wavelength $\lambda_0$, is used. The beam is first split into three beam portions $\lambda_0'$, $\lambda_0''$, $\lambda_0'''$ using a splitter 21. A suitable device for splitting a light beam in this manner is a Model S-P-15-AV-0103-A-B-0 splitter made by Global Opticom located in California. The first beam portion $\lambda_0'$ is applied directly into a wavelength-shifting SBS device 2 or acousto-optical device 12, to obtain a multiplicity of beams having the wavelengths $\lambda_1-\lambda_3$. These three wavelengths may be produced by a cascade arrangement of the type described above in connection with FIGS. 4, 5 or 6.

The second beam portion $\lambda_0''$ is first transformed by an OPO 20 to a beam having wavelength $\lambda_4$, which in turn is incident on another cascade arrangement of wavelength-shifting SBS devices 2 or acousto-optical devices 12, to obtain a multiplicity of beams having wavelengths $\lambda_5-\lambda_7$. The third beam portion $\lambda_0'''$ is first applied directly into a cascade arrangement of wavelength-shifting SBS devices 2 or acousto-optical devices 12, to obtain a multiplicity of beams having wavelengths $\lambda_8-\lambda_{10}$; these beams are then transformed by an OPO 20 to obtain output beams having wavelengths $\lambda_{11}-\lambda_{13}$. The OPO 20 is enabled to amplify and wavelength-shift three different beams simultaneously. Other combinations of OPO 20, SBS devices 2 and acousto-optical wavelength-shifting devices 12 are also possible.

FIG. 13 is a schematic illustration of a system 22, wherein a single input beam of wavelength $\lambda_0$ is transformed into a series of separated beams having different output wavelengths; in this specific embodiment, ten wavelengths $\lambda_1-\lambda_{10}$. The system 22 may include cascaded SBS devices or cascaded acousto-optical wavelength-shifting devices, or a combination of those with OPOs Also, the input wavelength $\lambda_0$ may be equal to one of the output wavelengths $\lambda_1-\lambda_{10}$.

FIG. 14 is a schematic illustration of a system 22, wherein a single input beam having a wavelength $\lambda_0$ is transformed into a series of separated beams having different output wavelengths $\lambda_1-\lambda_{10}$ as shown in FIG. 13, but each of the output beams is modulated by one of a group of parallel modulators 24a–24j. The purpose of the modulation is to use each optical output as a carrier for information that is combined with the carrier via the modulation process. One suitable modulator for this purpose is the Model 1976 EAM modulator made by Alcatel located in France. When all of the output beams are modulated, the number of modulators is the same as the number of output beams. Alternatively, groups of output beams can be modulated together by the same modulator, to obtain a broadcast-like transmission. Here again, the system 22 may include cascaded SBS devices, cascaded acousto-optical wavelength-shifting devices, or a combination of those with OPOs. Also, the input wavelength $\lambda_0$ may be the same as one of the output wavelengths $\lambda_1-\lambda_{10}$.

When the multiple-wavelength outputs from any of the systems described above are used in an optical communication system, it is preferred to transmit multiple wavelengths simultaneously in a single optical fiber or waveguide in at least a portion of the communication system. This multiplexing of multiple wavelengths in a single fiber can be accomplished by simply launching or coupling the different wavelengths into the same fiber or waveguide. Then at the receiving end of a communication link, it is typically necessary to re-separate or de-multiplex the different wavelengths.

FIG. 15 is a schematic illustration of an optical de-multiplexing system. An incident beam of light 26, composed of a multitude of wavelengths, is illuminated on a wavelength-dispersive component 28, such as a grating or a prism. One suitable component for this purpose is the Model NT43-209 grating made by Edmund Optics located in New Jersey. Component 28 splits, by diffraction, the incident beam 26 into a series of separate beams 29a–29n, each having a different wavelength. These beams 29a–29n, each propagating in a slightly different direction, are incident upon a receiver 30 that couples the separate beams into corresponding different output fibers 31a–31n, causing different output fibers to contain beams of different wavelengths. One suitable receiver for this purpose is the Model 1554 receiver made by New Focus located in California. Each separate beam 29 is preferably coupled into a separate fiber 31, representing a separate communication channel.

Optionally, as illustrated in FIG. 16, the receiver 30 can be physically moved by an actuator 32 to adjust the relative positions of the grating 28 and the receiver 30 in order to match the separate beams 29a–29n with the desired output fibers 31a–31n. The actuator 32 is preferably a controllable actuator such as a Model 8301 linear actuator made by New Focus located in California. Similarly, the diffraction component 28 can be tilted by a controllable actuator 34 in order to change the direction of the diffracted beams 29a–29n so as to match the incident wavelengths to given fibers 31a–31n representing the different output channels. Either of the two actuators 32 and 34 may be alone, or they may be used in combination with each other.

FIG. 17 illustrates an optical de-multiplexing system in which the incident beam of light 26 passes through an acousto-optical wavelength-shifting device 36, which changes the wavelength so that slightly different wavelengths are diffracted from component 28, leading to a slight change of the diffraction angles of the different wavelengths.

FIG. 18 is a schematic illustration of an optical de-multiplexing system having a feedback control loop 38, wherein two detectors 40, 42 are positioned on two sides of the desired position of one of the separate beams 29a–29n in the receiver 30 to detect at least one characteristic of that light beam. The two detectors 40, 42 form part of a feedback control loop for controlling the actuator 34 that controls the tilt angle of the diffraction component 28 to change the direction of the diffracted beams 29a–29n. In the illustrative example, each of the two detectors 40 and 42 detects the optical power level at one side of the beam 29n and produces a control signal representing the detected power level to a comparator 43. The comparator 43 serves as a controller that produces an output signal representing the magnitude of the difference between the two signals from the detectors 40 and 42. The polarity of this output signal preferably indicates which of the two detectors detected the higher power level.

The output signal from the comparator 43, within the control loop 38, is supplied to the controllable actuator 34 to adjust the tilt of the grating 28 until substantially equal power levels are detected in the two detectors 40, 42. The electrical polarity of the signal supplied to the actuator 34 determines the direction of movement of the actuator, which in turn determines whether the tilt angle is increased or decreased. Moreover, specific modulation or specific data formats in the control loop 38 may differentiate it from other channels, so the control loop can be readily found.

FIG. 19 illustrates an optical de-multiplexing system having a feedback control loop 44, wherein an optical splitter 47 diverts a portion of the power in one of the output fibers 3 In into a single detector 46 that detects the power level in that particular output fiber (namely, the control channel). The detector 46 supplies a signal representing the detected power level to a comparator 48 that also receives a fixed reference signal from a source 49, and produces an output signal representing the magnitude of any difference between the detector signal and the reference signal. The reference signal represents a desired power level. The polarity of the output signal from the comparator 48 preferably indicates whether the detector signal is greater than or less than the reference signal.

The output signal from the comparator 48 is supplied to the controllable actuator 34 that controls the tilt angle of the grating 28, causing the actuator 34 to adjust the tilt of the grating 28 until the signal from the detector 46 is substantially equal to the reference signal. The electrical polarity of the signal supplied to the actuator 34 determines the direction of movement of the actuator, which in turn determines whether the tilt angle of the grating 28 is increased or decreased. The control loop 44 thus maximizes or optimizes the output power level in channel 48, thereby also optimizing the power levels of all the other diffracted light beams. Control channel 48 may have a specific, known modulation, so as to allow for its identification, using techniques such as matched filtering.

FIG. 20 illustrates a multi-cascaded, multi-wavelength optical source 50. A beam having wavelength $\lambda_0$ injects into the first wavelength-shifting component 52a of a cascaded array of eight such components 52a–52h, which may be composed of SBS devices or acousto-optical wavelength-shifting devices, or a combination of these, with or without optical amplifiers. Each of the wavelength-shifting components 52a–52h introduces a new wavelength, to obtain, in a cascaded configuration, the first series of wavelengths $\lambda_1$–$\lambda_8$. Now, the last wavelength $\lambda_8$ in the first series is fed back through a splitter into the first wavelength-shifting component 52a, causing that component to produce an output having a wavelength $\lambda_9$ (or $\lambda_{8n+1}$, where n=1 for the first recirculation). Due to the cascade configuration, this causes the remaining wavelength-shifting components 52b–52h in the cascade to produce outputs having wavelengths $\lambda_{10}$–$\lambda_{16}$ (or $\lambda_{8n+2}$ to $\lambda_{8n+8}$, where n≠1). As the number of recirculations n increases, more wavelengths are simultaneously generated by the wavelength-shifting devices 52a–52h.

Each of the wavelength-shifting components 52a–52h is capable of simultaneously producing multiple outputs of different wavelengths in response to simultaneous input beams having different wavelengths, provided the wavelengths of the input beams are sufficiently spaced from each other. For example, if the spacing between successive output wavelengths produced by the wavelength-shifting components 52a–52h is 0.075 nm, the spacing between the two input wavelengths $\lambda_0$ and $\lambda_9$ to component 52a is 0.6 nm, which is sufficient to enable the components 52a to produce simultaneous outputs of different wavelengths in response to the simultaneous inputs of different wavelengths $\lambda_1$, $\lambda_{10}$. The same is true for all the other components 52b–52h as well, because the spacing between the wavelengths of the simultaneous inputs to each of these components will also be 0.6 nm. This enables its separation using available and low price dielectric filter demultiplexer.

By this multi-cascaded configuration, other series of wavelengths continue to be created. In order to control the number of series, the feedback loop between the output of the last wavelength-shifting component 52h and the input of the first component 52a includes a filter 54 that allows only a selected band of wavelengths to pass (for example, wavelengths below $\lambda_{8n}$, where n is below a threshold T, thus limiting the number of recirculations to n). When the last wavelength in a series exceeds the pass band of the filter 54, the feedback signal to the first wavelength-shifting component 52a is interrupted, causing the first series of outputs having wavelengths $\lambda_1$–$\lambda_8$ to be produced again. That is, the feedback is resumed with the output wavelength $\lambda_8$ produced by the last wavelength-shifting device 52h in response to the supply of only the wavelength $\lambda_0$ to the first device 52a. This first series of outputs is again followed by subsequent series of outputs until the pass band of the filter 54 is again exceeded, at which point the cycle repeats again.

The output beam from each of the wavelength-shifting components 52a–52h now contains several different wavelengths, according to the number of series. (In the embodiment shown in FIG. 20, there are three series.) In order to obtain separated wavelength channels, each of the output beams is passed through a demultiplexer 56a–56h of the simple type, for example a dielectric filter set, thus producing a large number of separated wavelengths with a relatively small number of components.

Referring now to FIGS. 21 and 22, the example of generating a 1 GHz cascade serves to illustrate an aspect of a communication system according to the present invention. Using a single, stabilized, tunable source, i.e., a stabilized, tunable laser, a wavelength cascade, having 10 GHz frequency spacing between each pair of neighboring wavelengths, is generated by means of an SBS technique. The wavelength cascade shown in FIG. 21 consists of ten successive spectral lines 60–69, represented by the first column in FIG. 22 (hereinafter, "type 1 cascade"). Each one of the lines in the type 1 cascade serves as a source for generating, also by means of SBS, a second wavelength cascade having 11 GHz spacing and nine successive spectral lines 70–78 (hereinafter, "type 2 cascade").

Altogether, from the ten spectral lines of the type 1 cascade, ten type 2 cascades can be generated. All of the lines in the single type 1 cascade and the ten type 2 cascades present a set of one hundred spectral lines having 1 GHz spacing between each two neighboring lines. Each spectral line exists in a separate fiber, allowing separate modulation for each line, the lines thus serving as a multiple wavelength source. The embodiment shown is not limited to one hundred spectral lines; similarly, it is not limited to 1 GHz spacing; it is, rather, a general illustration for any number of lines and any spacing between them.

FIG. 23 is a schematic illustration of a cascaded system with optical seeding. Here, the cascaded system is similar to that shown in FIG. 4. However, in addition, seeding light sources (in this case a single light source 80) such as a laser, a light-emitting diode, or an amplified spontaneous emission source, is coupled to some or all of six SBS devices 2a–2f producing six output beams having wavelengths $\lambda_1$–$\lambda_6$. The seeding light from the source 80 enhances the power and/or the stability of the light beams emitted from the four seeded Brillouin devices 2c–2f. To divide the beam from the source 80 into a multiplicity of beams, a device 82 such as a coupler, a splitter or a filter couples the source to the Brillouin devices 2c–2f to be seeded. The device 82 may be omitted if the light source 80 is connected to only a single Brillouin device. Optical isolators 84a–84d are connected between the device 82 and the respective Brillouin devices 2c–2f, to prevent light beams from propagating from the Brillouin devices toward the seed light source 80.

FIG. 24 is a graph of the measured output of an optical spectrum analyzer. The input to the optical spectrum analyzer consisted of five different wavelengths, generated by cascading of SBS devices. These five wavelengths, each propagated in a separate fiber, were combined using an optical splitter, in order to be measured together by the optical spectrum analyzer. As evident from the graph, there are five distinct wavelengths, with similar spacing between them.

FIG. 25 is a schematic illustration of a system with a backup laser 90 to the first laser source 91. Here, the backup laser source 90, which could be a fixed wavelength source or a tunable laser source, emits light having a wavelength of $\lambda_0$. When the original laser 91 fails, the optical switch 92 routes the beam emitted from the backup laser 90 into the first coupler of circulator 6 a. Thus, a failure in the first laser source does not result in a complete system failure.

FIG. 26 is a schematic illustration of a system with a tunable backup laser 94. Here, the tunable backup laser source 94 can emit any of the wavelengths in the cascaded configuration ($\lambda_1$–$\lambda_n$). When there is a failure in one of the cascaded elements, such as a failure of the component 6c, the wavelength $\lambda_3$ does not reach the coupler or circulator 6d, the tunable laser source 94 is tuned to $\lambda_3$, and the switch 96 routes the beam from the tunable source 94 to the switch or coupler 98c, which in turn routes it to the coupler or circulator 6d. In this way, all the following outputs $\lambda_4$–$\lambda_n$, remain as they should be. Note that without such backup source, a failure in one of the cascaded elements would immediately cause failure in all subsequent lines.

It will be evident to those skilled in the art that the invention is not limited to the details of the foregoing illustrated embodiments and that the present invention may be embodied in other specific forms without departing from the spirit or essential attributes thereof The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. An optical system for converting a single input beam of light into a plurality of spatially or angularly shifted output beams, each having a different wavelength, said system comprising:

an array of a plurality of acousto-optical and/or stimulated Brillouin scattering (SBS) wavelength-shifting devices in optical communication with each other, said devices being adapted to maintain substantially constant intra-wavelength spacings among said output beams by causing the wavelengths of said output beams to vary substantially uniformly with variations in the wavelength of said input beam and temperature.

2. The system as claimed in claim 1, further comprising a optical beam splitter or circulator located along the input and output paths of the beams to and from said wavelength-shifting devices, for reflecting said output beams in directions different than the directions of said output paths.

3. The system as claimed in claim 1, further comprising a optical amplifier located along the path of said input beam.

4. The system as claimed in claim 1, wherein at least a part of an output beam from one of said wavelength-shifting devices is utilized as an input beam another of said devices, forming a cascaded optical system.

5. The optical system as claimed in claim 4, wherein the output of the last of said devices is connected, via a filter, to the input of the first of said devices, and wherein a demultiplexer is connected to the output of at least one of said devices for producing multiple, separated wavelengths.

6. The system as claimed in claim 1, wherein said wavelength-shifting device is composed of a waveguide providing a continuously patterned optical path.

7. The system as claimed in claim 6, wherein said wavelength-shifting device is composed of a wound optical fiber.

8. The system as claimed in claim 7, wherein said fibers ave a small core area and are selected from the group comprising photonic bandgap fibers, dispersion compensating fibers, or high numerical aperture fibers.

9. The system as claimed in claim 1, wherein said wavelength-shifting devices are composed of different materials, one of said materials having an increasing refractive index with temperature change, and one having a decreasing refractive index with temperature change.

10. The system as claimed in claim 1, wherein an output beam for a first one of said wavelength-shifting devices constitutes a source for a second one of said devices.

11. The system as claimed in claim 1, further comprising an optical parametric oscillator (OPO) located along the input and/or output paths of at least one of said wavelength-shifting devices.

12. The system as claimed in claim 1, further comprising at least one modulator for modulating at least one of said output beams.

13. The system as claimed in claim 1, wherein said input beam is obtained from a tunable laser.

14. The system as claimed in claim 13, further comprising at least one tunable laser for backup purposes.

15. The system as claimed in claim 1, wherein said input beam is obtained from a fixed-wavelength laser.

16. The system as claimed in claim 1, wherein said input beam is obtained from one of a plurality of laser sources in parallel with each other so that, upon e malfunctioning of one of said sources, at least one of the other sources is utilized.

17. The optical system as claimed in claim 1, wherein said input beam comprises a multi-wavelength cascade created by the difference between two or more cascades of different spacings.

18. An optical system as claimed in claim 1 which include a feedback line for supplying the output beam of the last of said wavelength-shifting devices to he input of the first of said wavelength-shifting devices concurrently with the supplying of said input beam to said first wavelength-shifting device.

19. An optical system as claimed in claim 1, having at least one additional light source in connection with one or more acousto-optical and/or stimulated Brillouin scattering (SBS) wavelength-shifting devices.

20. An optical system for converting an input beam of light into a plurality of output beams having different wavelengths, said system comprising:
an array of a plurality of acousto-optical and/or stimulated Brillouin scattering (SBS) wavelength-shifting devices in optical communication with each other, the first wavelength-shifting device in said array receiving said input beam of light, thereby causing said first wavelength-shifting device to produce a first output beam having a wavelength shifted from that of said input beam, and
each of the remaining wavelength-shifting devices in said array receiving the output beam from the preceding wavelength-shifting device to cause each successive wavelength-shifting device to produce an output beam having a wavelength shifted from the wavelength of the input beam to that device,
whereby variations in the wavelength of said input beam or in temperature or strain of said wavelength-shifting devices will cause the wavelengths of said output beams to vary substantially uniformly, thus maintaining substantially constant intra-wavelength spacings between said output beams.

21. The system of claim 20 which includes an array of splitters each of which is connected to both the input and the output of one of said wavelength-shifting devices, and to the input of the next of said wavelength-shifting devices, for supplying the first wavelength-shifting device with said input beam, and for supplying each of the other wavelength-shifting devices with the output of the preceding wavelength-shifting device.

22. The system of claim 20 which includes a feedback line for supplying the output beam of the last of said wavelength-shifting devices to the input of first of said wavelength-shifting devices concurrently with the supplying of said input beam to said first wavelength-shifting device.

23. The system of claim 22 which includes a filter in said feedback line for limiting the wavelength of the output beam of said last wavelength-shifting device that can be fed back to said first wavelength-shifting device, thereby causing the feedback be resumed with the output beam produced by said last wavelength-shifting device in response to the supply of said input beam to said first wavelength-shifting device.

24. The system of claim 20 which includes a source of seeding light beams for said wavelength-shifting devices.

25. The system of claim 20 wherein each of said wavelength-shifting devices comprises first and second wavelength-shifting components connected series and having refractive indices that vary in opposite directions in response to temperature changes, whereby wavelength shifts caused by a temperature change in said first and second components substantially cancel each other.

26. The system of claim 20 which includes a separate output line for the output beam produced by each of said wavelength-shifting devices.

27. An optical system for converting an input beam of light into a plurality of output beams having different wavelengths, said system comprising:
an array of a plurality of wavelength-shifting devices in optical communication with each other, the first wavelength-shifting device in said array receiving said input beam of light, thereby causing said first wavelength-shifting device to produce a first output beam having a wavelength shifted from that of said input beam, and
said first wavelength-shifting device comprising first and second wavelength-shifting components connected in series and having refractive indices that vary in opposite directions in response to temperature changes, whereby wavelength shifts caused by a temperature change in said first and second components substantially cancel each other.

28. An optical system for converting an input beam of light into a plurality of output beams having different wavelengths, said system comprising:
an array of a plurality of wavelength-shifting devices in optical communication with each other, the first wavelength-shifting device in said array receiving said input beam of light, thereby causing said first wavelength-shifting device to produce a first output beam having a wavelength shifted from that of said input beam,
each of the remaining wavelength-shifting devices in said array receiving the output beam from the preceding wavelength-shifting device to cause each successive wavelength-shifting device to produce an output beam having a wavelength shifted from the wavelength of the input beam to that device, and
a feedback line for supplying the output beam of the last of said wavelength-shifting devices to the input of the first of said wavelength-shifting devices concurrently with the supplying of said input beam to said first wavelength-shifting device.

29. The system of claim 28 which includes a filter in said feedback line for the wavelength of the output beam of said last wavelength-shifting device that can be fed back to said first wavelength-shifting device, thereby causing the feedback be resumed with the output beam produced by said last wavelength-shifting device in response to the supply of said input beam to said first wavelength-shifting device.

30. A method of converting an input beam of light into a plurality of spatially or angularly shifted output beams, each having a different wavelength, said method comprising
supplying said input beam of light to the first of a plurality of acousto-optical and/or stimulated Brillouin scattering (SBS) wavelength-shifting devices in optical communication with each other, thereby causing said first wavelength-shifting device to produce a first output beam having a wavelength shifted from that of said input beam, and
supplying the output beam from each of said plurality of wavelength-shifting devices to the next of said plurality of wavelength-shifting devices to cause each successive wavelength-shifting device to produce an output beam having a wavelength shifted from the wavelength of the input beam to that device, and
maintaining substantially constant intra-wavelength spacings beam among said output beams by causing the wavelengths of said output beams to vary substantially uniformly with variations in the wavelength of said input beam and temperature.

31. The method of claim 30 which includes feeding the output beam of the last of said wavelength-shifting devices back to the input of the first of said wavelength-shifting devices concurrently with the supplying of said input beam to said first wavelength-shifting device.

32. The method of claim 31 which includes limiting the wavelength of the output team of said last wavelength-shifting device that can be fed back to said first wavelength-shifting device, thereby causing the feedback to be resumed with the output beam produced by said last wavelength-shifting device in response to the supply of said input beam to said first wavelength-shifting device.

33. The method of claim 30 which includes seeding said wavelength-shifting devices with light beams having predetermined characteristics.

34. The method of claim 30 wherein each of said wavelength-shifting devices comprises first and second wavelength-shifting components having refractive indices that vary in opposite directions in response to temperature changes, and supplying the output beam from said first component as the input to said second component so that the output beam from said wavelength-shifting device is the output beam from said second component, whereby wavelength shifts caused by a temperature change in said first and second components substantially cancel each other.

35. The method of claim 30 which includes supplying the output beam produced by each of said wavelength-shifting devices on a separate output line.

36. A method of converting an input beam of light into a plurality of output beams having different wavelengths, said method comprising:

supplying said input beam of light to the first of a plurality of wavelength-shifting devices in optical communication with each other, the first wavelength-shifting device in said array receiving said input beam of light, thereby causing said first wavelength-shifting device to produce a first output beam having a wavelength shifted from that of said input beam, said wavelength-shifting device including first and second wavelength-shifting components having refractive indices that vary in opposite directions in response to temperature changes, and supplying the output beam from said first component as the input to said second component so that the output beam from said wavelength-shifting device is the output beam from said second component, whereby wavelength shifts caused by a temperature change in said first and second components substantially cancel each other.

37. A method of converting an input beam of light into a plurality of output beams having different wavelengths, said method comprising supplying said input beam of light to the first of a plurality of wavelength-shifting devices in optical communication with each other, thereby causing said first wavelength-shifting device to produce a first output beam having a wavelength shifted from that of said input beam, seeding said wavelength-shifting device with a light beam having predetermined characteristics, and supplying the output beam from each of said plurality of wavelength-shifting devices to the next of said plurality of wavelength-shifting devices to cause each successive wavelength-shifting device to produce an output beam having a wavelength shifted from the wavelength of the input beam to that device, whereby variations in the wavelength of said input beam or in temperature or strain of said devices will cause the wavelengths of said output beams to uniformly vary, thus maintaining constant intra-wavelength spacings beam among said output beams.

38. A method of converting an input beam of light into a plurality of output beams having different wavelengths, said method comprising:

supplying said input beam of light to the first of a plurality of wavelength-shifting devices in optical communication with each other, thereby causing said first wavelength-shifting device to produce a first output beam having a wavelength shifted from that of said input beam, supplying the output beam from each of said plurality of wavelength-shifting devices to the next of said plurality of wavelength-shifting devices to cause each successive wavelength-shifting device to produce an output beam having a wavelength shifted from the wavelength of the input beam to that device, and supplying the output beam of the last of said wavelength-shifting device to the input of the first of said wavelength-shifting devices concurrently with the supplying of said input beam to said first wavelength-shifting device, whereby variations in the wavelength of said input beam or in temperature or strain of said devices will cause the wavelengths of said output beams to uniformly vary, thus maintaining constant intra-wavelength spacings beam among said output beams.

39. The method of claim which includes limiting the wavelength of the output beam of said last wavelength-shifting device that can be fed back to said first wavelength-shifting device, thereby causing the feedback to be resumed with the output beam produced by said last wavelength-shifting device in response to the supply of said input be to said first wavelength-shifting device.

40. An optical system for converting an input beam of light into a plurality of output beams having different wavelengths, said system comprising:

a single laser source producing an input beam of light, an array of a plurality of wavelength-shifting devices in optical communication with each other, the first wavelength-shifting device in said array receiving said input beam of light produced by said single laser source, thereby causing said first wavelength-shifting device to produce a first output beam having a wavelength shifted from that of said input beam, and each of the remaining wavelength-shifting devices in said array receiving the output beam from the preceding wavelength-shifting device to cause each successive wavelength-shifting device to produce an output beam having a wavelength shifted from the wavelength of the input beam to that device, whereby variations in the wavelength of said input beam from said single laser source or in temperature or strain of said wavelength-shifting devices will cause the wavelengths of said output beams to vary substantially uniformly, thus maintaining substantially constant intra-wavelength spacings between said output beams.

41. The optical system of claim 40 which includes optical amplifiers for amplifying the input beams to at least some of said wavelength-shifting devices.

42. An optical system for converting a single input beam of light into a plurality of spatially or angularly shifted output beams, each having a different wavelength, said system comprising:

an array of a plurality of acousto-optical and/or stimulated Brillouin scattering (SBS) wavelength-shifting devices in optical communication with each other, said devices being adapted to maintain substantially constant intra-wavelength spacings among said output beams by causing the wavelengths of said output beams to vary substantially uniformly with variations in the wavelength of said input beam and strain of said devices.

43. A method of converting an input beam of light into a plurality of spatially or angularly shifted output beams, each having a different wavelength, said method comprising supplying said input beam of light to the first of a plurality of acousto-optical and/or stimulated Brillouin scattering (SBS) wavelength-shifting devices in optical communication with each other, thereby causing said first wavelength-shifting device to produce a first output beam having a wavelength shifted from that of said input beam, and supplying the output beam from each of said plurality of wavelength-shifting devices to the next of said plurality of wavelength-shifting devices to cause each successive wavelength-shifting device to produce an output beam having a wavelength shifted from the wavelength of the input beam to that device, and maintaining substantially constant intra-wavelength spacings among said output beams by causing the wavelengths of said output beams to vary substantially uniformly with variations in the wavelength of said input beam and strain of said devices.

44. The system as claimed in claim 1, wherein said wavelength-shifting devices comprise an optical fiber wound on a spool or structure having an expansion coefficient selected to produce a change in the refractive index of said fiber in response to temperature change that substantially cancels the change caused by said temperature change in said refractive index of said fiber, so as to maintain substantially constant intra-wavelength spacings between said output beams.

45. The system as claimed in claim 42, wherein said wavelength-shifting devices comprise an optical fiber wound on a spool or structure having an expansion coefficient selected to produce a change in the refractive index of said fiber in response to temperature change that substantially cancels the change caused by said temperature change in said refractive index of said fiber, so as to maintain substantially constant intra-wavelength spacings between said output beams.

46. The method of claim 30, wherein said wavelength-shifting devices comprise an optical fiber wound on a spool or structure having an expansion coefficient selected to produce a change in the refractive index of said fiber in response to a temperature change that substantially cancels the change caused by said temperature change in said refractive index of said fiber, so as to maintain substantially constant intra-wavelength spacings between said output beams.

47. The method of claim 43, wherein said wavelength-shifting devices comprise an optical fiber wound on a spool or structure having an expansion coefficient selected to produce a change in the refractive index of said fiber in response to a temperature change that substantially cancels the change caused by said temperature change in said refractive index of said fiber, so as to maintain substantially constant intra-wavelength spacings between said output beams.

* * * * *

UNITED STATES PATENT AND TRADEMARK OFFICE
CERTIFICATE OF CORRECTION

PATENT NO. : 6,847,477 B2
DATED : January 25, 2005
INVENTOR(S) : Ram Oron et al.

It is certified that error appears in the above-identified patent and that said Letters Patent is hereby corrected as shown below:

Column 14,
Lines 10 and 15, "a" should read -- an --
Line 18, after "beam" add -- to --
Line 32, "ave" should be -- have --
Line 58, "e" should be -- the --
Line 65, "include" should read -- includes --
Line 67, "he" should be -- the --

Column 15,
Line 41, before "first" add -- the --
Line 48, after "feedback" add -- to --
Line 55, after "connected" add -- in --

Column 16,
Line 35, after "for" add -- limiting --
Line 38, after "back" add -- to --
Line 58, before "among" delete "beam"

Column 17,
Line 2, change "team" to "beam"
Line 64, before "among" delete "beam"

Column 18,
Line 14, change "device" to -- devices --
Line 22, before "among" delete "beam"
Line 23, after "claim" add -- 38 --
Line 28, change "be" to -- beam --

Column 19,
Line 26, after "to" add --a --

UNITED STATES PATENT AND TRADEMARK OFFICE
CERTIFICATE OF CORRECTION

PATENT NO. : 6,847,477 B2
DATED : January 25, 2005
INVENTOR(S) : Ram Oron et al.

It is certified that error appears in the above-identified patent and that said Letters Patent is hereby corrected as shown below:

Column 20,
Line 5, after "to" add -- a --

Signed and Sealed this

Twenty-sixth Day of April, 2005

JON W. DUDAS
*Director of the United States Patent and Trademark Office*

UNITED STATES PATENT AND TRADEMARK OFFICE
CERTIFICATE OF CORRECTION

PATENT NO.        : 6,847,477 B2                                      Page 1 of 1
APPLICATION NO.   : 10/084796
DATED             : January 25, 2005
INVENTOR(S)       : Ram Oron et al.

It is certified that error appears in the above-identified patent and that said Letters Patent is hereby corrected as shown below:

On the title page item (73), "Kilolamdia IP Limited" should read --KiloLambda IP Limited--

Signed and Sealed this

Third Day of April, 2007

JON W. DUDAS
*Director of the United States Patent and Trademark Office*